United States Patent
Shibuya

(10) Patent No.: US 10,349,456 B2
(45) Date of Patent: Jul. 9, 2019

(54) VIDEO COMMUNICATION SYSTEM, VIDEO TRANSMISSION TERMINAL, VIDEO RECEPTION TERMINAL, COMMUNICATION METHOD, AND RECORDING MEDIUM

(71) Applicant: OLYMPUS CORPORATION, Hachioji-shi, Tokyo (JP)

(72) Inventor: Kazuyuki Shibuya, Sagamihara (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/725,389

(22) Filed: Oct. 5, 2017

(65) Prior Publication Data
US 2018/0035482 A1    Feb. 1, 2018

Related U.S. Application Data

(63) Continuation of application No. PCT/JP2015/061324, filed on Apr. 13, 2015.

(51) Int. Cl.
*H04L 29/06* (2006.01)
*H04W 76/14* (2018.01)
(Continued)

(52) U.S. Cl.
CPC ......... *H04W 76/14* (2018.02); *H04L 65/1059* (2013.01); *H04L 65/1069* (2013.01);
(Continued)

(58) Field of Classification Search
None
See application file for complete search history.

(56) References Cited

U.S. PATENT DOCUMENTS

2008/0028310 A1   1/2008 Ouchi
2010/0075605 A1   3/2010 Yoneda et al.
(Continued)

FOREIGN PATENT DOCUMENTS

JP    2006-115299 A   4/2006
JP    2008-35374 A    2/2008
(Continued)

OTHER PUBLICATIONS

International Search Report dated Jun. 30, 2015, issued in counterpart of International Application No. PCT/JP2015/061324 (1 page).
(Continued)

*Primary Examiner* — Brian S Roberts
(74) *Attorney, Agent, or Firm* — Westerman, Hattori, Daniels & Adrian, LLP

(57) ABSTRACT

A video communication system includes a video transmission terminal and a video reception terminal. In the video transmission terminal, a first control unit causes the video transmission terminal to be disconnected from a first network by controlling a first communication session control unit. After the video transmission terminal is disconnected from the first network, the first control unit causes the video transmission terminal to start an operation as an access point by controlling the first communication session control unit and causes the first communication session control unit to create a second network. The first control unit causes the first video session control unit to establish a video session with the video reception terminal.

14 Claims, 23 Drawing Sheets

(51) Int. Cl.
*H04W 76/10* (2018.01)
*H04M 11/00* (2006.01)
*H04W 84/12* (2009.01)
*H04W 76/30* (2018.01)
*H04W 76/23* (2018.01)
*H04L 29/08* (2006.01)

(52) U.S. Cl.
CPC .......... *H04L 65/4069* (2013.01); *H04L 67/14* (2013.01); *H04L 67/141* (2013.01); *H04M 11/00* (2013.01); *H04W 76/10* (2018.02); *H04W 76/23* (2018.02); *H04W 76/30* (2018.02); *H04W 84/12* (2013.01)

(56) References Cited

U.S. PATENT DOCUMENTS

| | | | | |
|---|---|---|---|---|
| 2014/0096165 | A1* | 4/2014 | Bei | H04N 19/46 725/81 |
| 2014/0201415 | A1* | 7/2014 | Huang | G06F 13/00 710/303 |
| 2014/0223501 | A1* | 8/2014 | Jin | H04N 21/23805 725/90 |
| 2014/0328262 | A1* | 11/2014 | Sampath | H04L 5/0073 370/329 |
| 2014/0334381 | A1* | 11/2014 | Subramaniam | H04L 65/604 370/328 |

FOREIGN PATENT DOCUMENTS

| | | |
|---|---|---|
| JP | 2008-035375 A | 2/2008 |
| JP | 2010-79423 A | 4/2010 |
| JP | 2011-244151 A | 12/2011 |
| WO | 2012/004944 A1 | 1/2012 |

OTHER PUBLICATIONS

Office Action dated Sep. 18, 2018, issued in counterpart Japanese Application No. 2017-512470, with English translation (6 pages).

* cited by examiner

VIDEO COMMUNICATION SYSTEM, VIDEO TRANSMISSION TERMINAL, VIDEO RECEPTION TERMINAL, COMMUNICATION METHOD, AND RECORDING MEDIUM

This application is a continuation application, based on International Patent Application No. PCT/JP2015/061324, filed Apr. 13, 2015, the content of which is incorporated herein by reference.

BACKGROUND OF THE INVENTION

Field of the Invention

The present invention relates to a video communication system, a video transmission terminal, a video reception terminal, a communication method, and a recording medium.

Description of Related Art

With the increase in speed of wireless local area networks (LAN) and quality of service (QoS) becoming widespread, opportunities for video communication between devices using a wireless LAN have been increasing. There is a demand from users for high quality video communication. For example, there is a demand for high resolution and low compression (or non-compression) of videos. Alternatively, there may be a demand for reduction in delay between a video transmission terminal and a video reception terminal. Therefore, the amount of communication in a wireless LAN network accounted for by video communication data has increased, and prioritization in communication tends to be required.

In a wireless LAN network (infrastructure network): provided by a general access point (hereinafter abbreviated as an AP), two terminals that are stations (hereinafter abbreviated as STAs) may perform video communication. Communication via the AP or communication with terminals other than terminals that perform video communication inside the same network causes a decrease in the amount of data that can be communicated and an increase in the amount of delay. Therefore, it is difficult to satisfy the demand from users for high quality video communication.

Meanwhile, in recent years, in a terminal such as a PC, a TV, and a mobile phone, an AP function has been realized by software. One of a video transmission terminal and a video reception terminal becomes an AP and creates a network. The other of the video transmission terminal and the video reception terminal is connected to the terminal operating as the AP. Accordingly, the video transmission terminal, and the video reception terminal can directly perform video communication. Therefore, a large amount of data can be communicated with low delay. That is, high quality video communication is easily realized.

Japanese Unexamined Patent Application, First Publication No. 2011-244151 discloses a technology in which when, a new terminal participates in a network, a terminal corresponding to a service provided by the new terminal, becomes an AP. For example, when the new terminal is a video transmission terminal, a video reception terminal corresponding to the video transmission can be the AP through this technology. Therefore, the video transmission terminal and the video reception terminal can directly perform video communication.

On the other hand, for a technology in which a terminal directly performs video communication, Miracast (registered trademark) standards are established. When the video transmission terminal and the video reception terminal directly perform video communication, these standards can be used. In Miracast (registered trademark), the video transmission terminal and the video reception terminal determine which of the video transmission terminal and the video reception terminal becomes an AP. Then, a video is transmitted directly from the video transmission terminal to the video reception terminal. The video reception terminal displays the received video.

SUMMARY OF THE INVENTION

According to a first aspect of the present invention, a video communication system includes a video transmission terminal and a video reception terminal. The video transmission terminal includes a first communication unit, a first communication session control unit, a first, video session control unit, and a first, control unit. The first communication session control unit creates a network when the video transmission terminal operates as an access point, and participates in a network created by the access point when the video transmission terminal operates as a station. The first video session control unit establishes a video session with the video reception terminal, and transmits a video to the video reception terminal with which the video session is established using the first communication unit after the video session is established. The first control unit executes a first transmission terminal process, a second transmission terminal process, and a third transmission terminal process. In a case in which video transmission information regarding video transmission is received from the video reception terminal while the video transmission terminal operates as the station and the video transmission terminal participates in a first network, the first control unit causes the video transmission terminal to be disconnected from the first network by controlling the first communication session control unit in the first transmission terminal process. After the video transmission terminal is disconnected from the first network, the first control unit causes the video transmission terminal to start an operation as the access point by controlling the first communication session control unit and causes the first communication session control unit to create a second network in the second transmission terminal process. In the third transmission terminal process, the first control unit causes the first video session control unit to establish the video session with the video reception terminal. The first network is a network created by a terminal different from the video transmission terminal and the video reception terminal. The video reception terminal that transmits the video transmission information is a terminal that has participated in the first network and of which the video session has not been established with the video transmission terminal. The video reception terminal includes a second communication unit, a second communication session control unit, a second video session control unit, and a second control unit. The second communication session control unit creates a network when the video reception terminal operates as the access point, and participates in a network created by the access point when the video reception, terminal operates as the station. The second video session control unit establishes the video session with the video transmission terminal, and receives the video from the video transmission terminal with which the video session is established using the second communication unit after the video session is established. The second control unit executes a first reception terminal process, a second reception terminal process, a third reception terminal process, and a fourth reception terminal process. While the video reception terminal operates as the station and the video reception terminal participates in the first network, the second control unit transmits the video transmission information to the video transmission terminal using the second communication unit in the first reception terminal process. After the video transmission information is transmitted, the second control unit causes the video reception terminal to the disconnected from the first network by controlling the second communication session control unit in the second reception terminal process. After the video reception terminal is disconnected from the first network, the second control unit causes the video reception terminal to participate in the second network by controlling the second communication session control, unit in the third reception terminal process. In the fourth reception terminal process, the second control unit causes the second video session control unit to establish the video session with the video transmission terminal. The video transmission terminal that receives the video transmission information is a terminal that has participated in the first network and of which the video session has not been established with the video reception terminal.

According to a second aspect of the present invention, in the first aspect, the first control unit may cause the first video session control unit to execute at least some of the processes needed to establish the video session with the video reception terminal before the video transmission terminal is disconnected from the first network in the third transmission terminal process. After the first control, unit causes the first video session control unit to execute at least, some of the processes needed to establish the video session, the first control unit may execute the first transmission terminal process.

According to a third aspect, of the present invention, in the second aspect, the processes needed to establish the video session may include at least exchange of messages regarding a determination of a video format, exchange of messages regarding a determination of an audio format, and exchange of messages regarding a confirmation as to whether or not preparation for video transmission has been completed in the video transmission terminal and the video reception terminal.

According to a fourth aspect of the present invention, in the second aspect, in the first transmission terminal process, the first control unit may cause the video transmission terminal to be disconnected from the first network after the first video session control unit completes all of the processes needed to establish the video session by controlling the first communication session control unit. In the second reception terminal process, the second control unit may cause the video reception terminal to be disconnected from the first network after the second video session control unit completes all of the processes needed to establish the video session, by controlling the second communication session control unit.

According to a fifth aspect of the present, invention, in the fourth aspect, the video reception terminal may farther include an application that displays the video received from the video transmission terminal by controlling a display unit. When the application starts, the second control unit may execute the first reception terminal process. The second control unit may cause the second video session control unit to perform all of the processes needed to establish the video session in the fourth reception terminal process between a point in time at which the application starts and a point in time at which the video transmission terminal that transmits the video that is displayed by the application is specified After the video transmission terminal is specified, the second control unit may execute the second reception terminal process.

According to a sixth aspect of the present invention, in the second aspect, in the third transmission terminal process, the first control unit may cause the first video session control unit to execute some of the processes needed to establish the video session with the video reception terminal before the video transmission terminal is disconnected from the first network, and in the third transmission terminal process, the first, control unit may cause the first video session control unit to execute the rest of the processes needed to establish the video session with the video reception terminal after the second network is created. In the fourth reception terminal process, the second control unit may cause the second video session control unit to execute some of the processes needed to establish the video session with the video transmission terminal before the video reception terminal is disconnected from the first network, and in the fourth reception terminal process, the second control unit may cause the second video session control and unit to execute the rest of the processes needed to establish the video session with the video transmission terminal after the video reception terminal participates in the second network.

According to a seventh aspect, of the present invention, in the first aspect, in the first transmission terminal process, the first control unit may transmit network information to the video reception terminal that has transmitted the video transmission information by controlling the first communication unit. The network information may include at least one of identification information, channel information, and security information. The identification information is for identifying the second, network. The channel information is related to a communication channel that is used in the second network. The security information is related to authentication needed to participate in the second network. After the network information is transmitted, the first control unit may cause the video transmission terminal to be disconnected from the first network by controlling the first communication session control unit in the first transmission terminal process.

According to an eighth aspect of the present invention, in the first aspect, in the first transmission terminal process, the first control unit may transmit access point information to the video reception terminal that has transmitted the video transmission information by controlling the first communication unit. The access point information indicates that the video transmission terminal becomes the access point. After the access point information is transmitted, the first control unit may cause the video transmission terminal to be disconnected from the first network by controlling the first communication session control unit in the first transmission terminal process.

According to a ninth aspect of the present, invention, a video transmission terminal includes: a first communication unit, a first communication session control unit, a first video session control unit, and a first control unit. The first communication session control unit creates a network when the video transmission terminal operates as an access point, and participates in a network created by the access point when the video transmission terminal operates as a station. The first video session control unit establishes a video session with the video reception terminal, and transmits a video to the video reception terminal with which the video session is established using the first communication unit after the video session is established. The first control unit executes a first transmission terminal process, a second transmission terminal process, and a third transmission terminal process. In a case in which video transmission information regarding video transmission is received from the video reception terminal while the video transmission terminal operates as the station and the video transmission terminal participates in a first network, the first control unit causes the video transmission terminal to be disconnected from the first network by controlling the first communication session control unit in the first transmission terminal process. After the video transmission terminal is disconnected from the first network, the first control unit causes the video transmission terminal to start an operation as the access point by controlling the first communication session control unit and causes the first communication session control unit to create a second network in the second transmission terminal process. In the third transmission terminal process, the first control unit causes the first video session control unit to establish the video session with the video reception terminal. The first network is a network created by a terminal different from the video transmission terminal and the video reception terminal. The video reception terminal that transmits the video transmission information is a terminal that has participated in the first network and of which the video session has not been established with the video transmission terminal According to a tenth aspect of the present invention, a video reception terminal includes: a second communication unit, a second communication session control unit, a second video session control unit, and a second control unit. The second communication session control unit creates a network when the video reception terminal operates as an access point, and participates in a network, created by the access point when the video reception terminal operates as a station. The second video session control unit establishes a video session with the video transmission terminal, and receives a video from the video transmission terminal with which the video session is established using the second communication unit after the video session is established. The second control unit executes a first reception terminal process, a second reception terminal process, a third reception terminal process, and a fourth reception terminal process. While the video reception terminal operates as the station and the video reception terminal participates in the first network, the second control unit transmits video transmission information regarding video transmission to the video transmission terminal using the second communication unit in the first reception terminal process. After the video transmission information is transmitted, the second control unit causes the video reception terminal to be disconnected from the first network by controlling the second communication session control unit in the second reception terminal process. After the video reception terminal is disconnected from the first network, the second control unit causes the video reception terminal to participate in the second network by controlling the second communication session control unit in the third reception terminal process. In the fourth reception terminal process, the second control unit causes the second video session control unit to establish the video session with the video transmission terminal. The first network is a network created by a terminal different from the video transmission terminal and the video reception terminal. The second network is a network created by the video transmission terminal that receives the video transmission information. The video transmission, terminal that receives the video transmission information is a terminal that has participated in the first network and of which the video session has not been established with the video reception terminal.

According to an eleventh aspect of the present invention, a communication method includes a first step, a second step, a third step, and a fourth step. A video transmission terminal creates a network when the video transmission terminal operates as an access point, and participates in a network created by the access point when the video transmission terminal operates as a station. In a case in which video transmission information regarding video transmission is received from the video reception terminal while the video transmission terminal operates as the station and the video transmission terminal participates in a first network, the video transmission terminal is disconnected from the first network in the first step. After the video transmission terminal is disconnected from the first network, the video transmission terminal starts an operation as the access point and creates a second network in the second step. In the third step, the video transmission terminal establishes a video session with the video reception terminal. In the fourth step, the video transmission terminal transmits a video to the video reception terminal with which the video session is established after the video session is established. The first network is a network created by a terminal different from the video transmission terminal and the video reception terminal. The video reception terminal that transmits the video transmission information is a terminal that has participated in the first network and of which the video session has not been established with the video transmission terminal.

According to a twelfth aspects of the present invention, a communication method includes a first step, a second step, a third step, a fourth step, and a fifth step. The video reception terminal creates a network when the video reception terminal operates as an access point, and participates in a network created by the access point when the video reception terminal operates as a station. While the video reception terminal operates as the station and the video reception terminal participates in the first network, the video reception terminal transmits the video transmission information regarding video transmission to a video transmission terminal in the first step. After the video transmission information is transmitted, the video reception terminal is disconnected from the first network in the second step. After the video reception terminal is disconnected from the first network, the video reception terminal participates in a second network in the third step. In the fourth step, the video reception terminal establishes the video session with the video, transmission terminal. In the fifth step, the video reception terminal receives a video from the video transmission terminal with which the video session is established after the video session is established. The first network is a network created by a terminal different from the video transmission terminal and the video reception terminal. The second network is a network created by the video transmission terminal that receives the video transmission information. The video transmission terminal that receives the video transmission information is a terminal that has participated in the first network and of which the video session has not been established with the video reception terminal.

According to a thirteenth aspect of the present invention, a non-transitory computer readable recording medium saves a program to cause a computer of a video transmission terminal to execute a first step, a second step, a third step, and a fourth step is provided. A video transmission terminal creates a network when the video transmission terminal operates as an access point, and participates in a network created by the access point when the video transmission terminal operates as a station. In a case in which video transmission information regarding video transmission is received from the video reception terminal while the video transmission terminal operates as the station and the video transmission terminal participates in a first network, the video transmission terminal is disconnected from the first, network in the first step. After the video transmission terminal is disconnected from the first network, the video transmission terminal starts an operation as the access point and creates a second network in the second step. In the third step, the video transmission terminal establishes a video session with the video reception terminal. In the fourth step, the video transmission terminal transmits a video to the video reception terminal with which the video session is established after the video session is established. The first network is a network created by a terminal different from the video transmission terminal and the video reception terminal. The video reception terminal that transmits the video transmission information is a terminal that has participated in the first network and of which the video session has not been established with the video transmission terminal.

According to a fourteenth aspect of the present invention, a non-transitory computer readable recording medium saves a program to cause a computer of a video reception terminal to execute a first step, a second step, a third step, a fourth step, and a fifth step is provided. The video reception terminal creates a network when the video reception terminal operates as an access point, and participates in a network created by the access point when the video reception terminal operates as a station. While the video reception terminal operates as the station and the video reception terminal participates in the first network, the video reception terminal transmits the video transmission information regarding video transmission to a video transmission terminal in the first step. After the video transmission information is transmitted, the video reception terminal is disconnected from the first network in the second step. After the video reception terminal is disconnected from the first network, the video reception terminal participates in a second network in the third step. In the fourth step, the video reception terminal establishes the video session with the video transmission terminal. In the fifth step, the video reception terminal receives a video from the video transmission terminal with which the video session is established after the video session is established. The first network is a network created by a terminal/different front the video transmission terminal and the video reception terminal. The second network is a network created by the video transmission terminal that receives the video transmission information. The video transmission terminal that receives the video transmission information is a terminal that has participated in the first network and of which the video session has not been established with the video reception terminal.

DETAILED DESCRIPTION OF THE INVENTION

Embodiments of the present invention will be described with reference to the drawings.
(First Embodiment)

Figure 1:
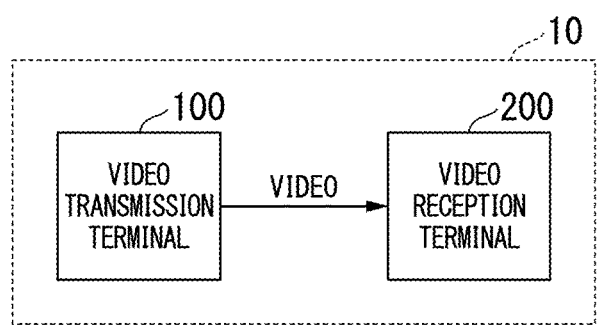
FIG. 1 is a block diagram showing a configuration of a video communication system according to a first embodiment of the present invention.

FIG. 1 shows a configuration of a video communication, system 10 of a first embodiment of the present invention. As shown in FIG. 1, the video communication system 10 includes a video transmission terminal 100 and a video reception terminal. 200. The video transmission terminal 100 and the video reception terminal 200 perform video transmission using wireless communication. In FIG. 1, one video transmission terminal 100 and one video reception terminal 200 are shown. There may be a plurality of transmission, terminals 100 or a plurality of video reception terminals 200.

The video transmission terminal 100 and the video reception terminal 200
operate as an access point (AP) or a station (STA). When the video transmission terminal 100 operates as an AP, the video transmission terminal 100 creates a network. When the video transmission terminal 100 operates as an STA, the video transmission terminal 100 participates in the network created by the AP. When the video reception terminal 200 operates as an AP, the video reception terminal 200 creates a network. When the video reception terminal 200 operates as an STA, the video reception terminal 200 participates in the network created by the AP.

Figure 2:
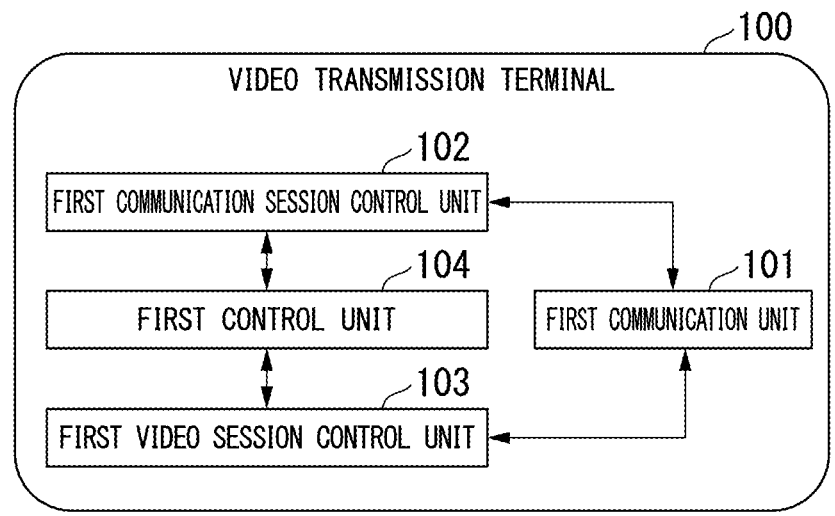
FIG. 2 is a block diagram showing a configuration of a video transmission terminal in the first embodiment of the present invention.

FIG. 2 shows a configuration of the video transmission terminal 100. As shown in FIG. 2, the video transmission terminal 100 includes a first communication unit 101, a first communication session control unit 102, a first video session control unit 103, and a first control unit 104.

The first communication unit 101 is a wireless communication circuit. The first communication unit 101 performs wireless communication with the video reception terminal 200, The first, communication unit 101 transmits a video to the video reception terminal 200. Further, the first communication unit 101 receives video transmission information regarding video transmission from the video reception terminal 200.

The first communication session control unit 102, the first video session control unit 103, and the first control unit 104 are processors such as central processing units (CPUs).

The first communication session control unit 102 performs communication control in a data link layer of an Open Systems Interconnection (OSI) reference model. The first communication session control unit 102 generates a network when the video transmission terminal 100 operates as an AP. The first communication session control unit 102 participates in a network created by the AP when the video transmission terminal 100 operates as an STA. The first communication session control unit 102 is disconnected from the network, as necessary.

The first video session control unit 103 performs communication control in an application layer. The first video session control unit 103 establishes a video session with the video reception terminal 200. The first video session control unit 103 transmits a video to the video reception terminal 200 with which the video session has been established, by using the first communication unit 101 after the video session has been established.

The first control unit 104 executes a first transmission terminal process, a second transmission terminal process, and a third transmission terminal process. While the video transmission terminal 100 operates as an STA and the video transmission terminal 100 participates in the first network, in a case in which the video transmission information regarding video transmission is received from the video reception terminal 200, the first control unit 104 causes the video transmission terminal 100 to be disconnected from the first network by controlling the first communication session control unit 102 in the first transmission terminal process. After the video transmission terminal 100 is disconnected from the first network, the first control unit 104 causes the video transmission terminal 100 to start an operation as the AP by controlling the first communication session control unit 102 and causes the first communication session control unit 102 to create a second network in the second transmission terminal process. The second network is different from the first network. In the third transmission terminal process, the first control unit 104 causes the first video session control unit 103 to establish the video session with tire video reception terminal 200.

The first network is a network created by a terminal (AP) different from the video-transmission terminal 100 and the video reception terminal 200. The video reception terminal 200 that transmits the video transmission information is a terminal that participates in the first network and of which the video session has not been established with the video transmission terminal 100.

The video transmission terminal 100 may include an imaging unit that generates a video. The video transmission terminal 100 may include an input unit that receives a video from another terminal. The video transmission terminal 100 may store a storage unit that stores a video or the like.

For example, the video transmission information is a video transmission request for requesting transmission of a video. Alternatively, the video transmission information may be a message for establishing a video session. Alternatively, the video transmission, information may be a message for requesting creation of a new network for video transmission. The video transmission information may be information on video transmission and other than the above-described information.

For example, the functions of the first communication session control unit 102, the first video session control unit 103, and the first control unit 10 can be realized as functions of software by a computer of the video transmission terminal 100 reading and executing a program including instructions that define operations of the first communication session control unit 102, the first video session control unit 103, and the first control unit 104. This program may be provided by, for example, a "computer-readable recording medium" such as a flash memory. Further, the above-described program may be transmitted from a computer system including a storage device or the like in which the program is stored to the video transmission terminal 100 via a transmission medium or by transmission waves in the transmission medium. The "transmission medium" for transmitting the program refers to a medium having a function of transmitting information, such as a network (communication network) such as the Internet or a communication line such as a telephone line. Further, the above-described program may realize some of the above-described functions. Further, the above-described program may be a differential file (a differential program) capable of realizing the above-described functions in combination with a program previously recorded in a computer.

Figure 3:
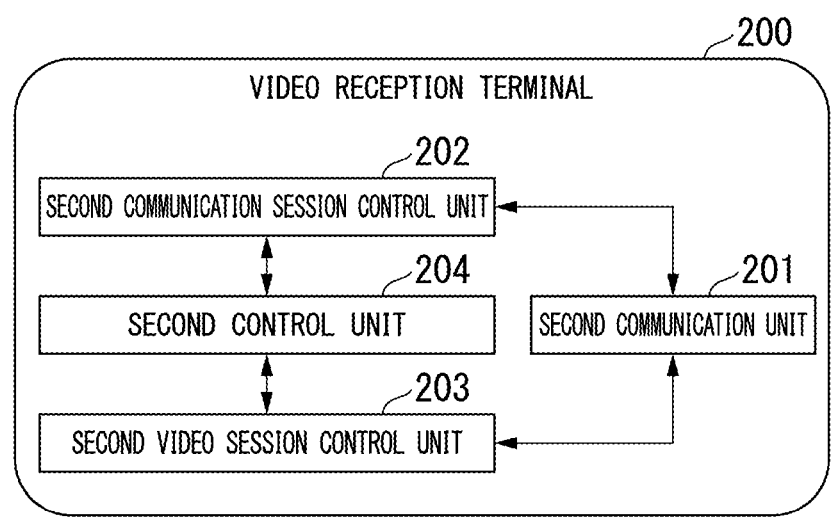
FIG. 3 is a block diagram showing a configuration of a video reception terminal in the first embodiment of the present invention.

FIG. 3 shows a configuration of the video reception terminal 200. As shown in FIG. 3. the video reception terminal 200 includes a second communication unit 201, a second communication session control unit 202, a second video session control unit 203, and a second control unit 204.

The second communication unit 201 is a wireless communication circuit. The second communication unit 201 performs wireless communication with the video transmission terminal 100. The second communication unit 201 receives the video from the video transmission terminal 100. Further, the second communication unit 201 transmits the video transmission information regarding video transmission to the video transmission terminal 100.

The second communication session control unit 202, the second video session control unit 203, and the second control unit 204 are processors such as CPUs.

The second communication session control unit 202 performs communication control in a data link layer of the OSI reference model. The second communication session control unit 202 creates a network when the video reception terminal 200 operates as an AP. The second communication session control unit 202 participates in the network created by the AP when the video reception terminal 200 operates as the STA. The second communication session control unit 202 is disconnected from the network as necessary.

The second video session control unit 203 performs communication control in the application layer. The second video session control unit 203 establishes a video session with the video transmission terminal 100. The second video session control unit 203 receive a video from the video transmission terminal 100 with which the video session has been established, using the second communication unit 201 after the video session is established.

The second control unit 204 executes a first reception terminal process, a second reception terminal process, a third reception terminal process, and a fourth reception terminal process. While the video reception terminal 200 operates as the STA and the video reception terminal 200 participates in the first network, the second control unit 204 transmits the video transmission information to the video transmission terminal 100 using, the second communication unit 201 in the first reception terminal process. After the video transmission information is transmitted, the second control unit 204 causes the video reception terminal 200 to be disconnected from the first network by controlling the second communication session control unit 202 in the second reception terminal process. After the video reception terminal 200 is disconnected from the first network, the second control unit 204 causes the video reception terminal 200 to participate in the second network by controlling the second communication session control unit 202 in the third reception terminal process. In the fourth reception terminal process, the second control unit 204 causes the second video session control unit 203 to establish a video session with the video transmission terminal 100.

The first network is a network created by a terminal (AP) different from the video transmission terminal 100 and the video reception terminal 200. The second network is a network created by the video transmission terminal 100 that receives the video transmission information. The video transmission terminal 100 that receives the video transmission information is a terminal that participates in the first network and of which the video session has not been established with the video reception terminal 200.

The video reception terminal 200 may include display unit that displays a video. The video reception terminal 200 may include an output unit that outputs a video. The video reception terminal 200 may include a storage unit that stores a video.

For example, the functions of the second communication session control unit 202, the second video session control unit 203, and the second control unit 204 can be realized, as functions of software by a computer of the video reception terminal 200 reading and executing a program including instructions that define operations of the second communication session control unit 202, the second video session control unit 203, and the second control unit 204. A realization form of this program is the same as a realization form of a program for realizing the function of the video transmission terminal 100.

Figure 4:
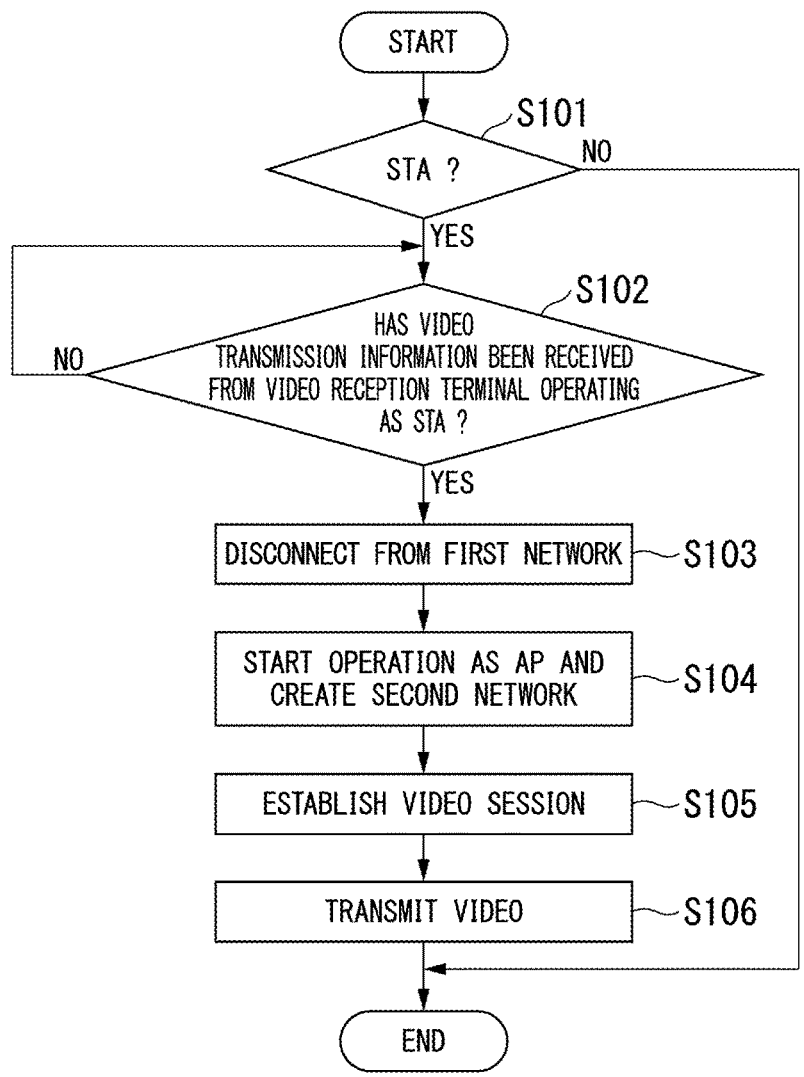
FIG. 4 is a flowchart showing a procedure of an operation, of the video transmission terminal of the first embodiment of the present invention.

FIG. 4 shows a procedure of an operation of the video transmission terminal 100. In FIG. 4, an operation while the video transmission terminal 100 operates as an STA is mainly shown. The video transmission terminal 100 can operate as an AP. Further, the video transmission terminal 100 may perform an operation using Miracast (registered trademark).

An operation of the video transmission terminal 100 will be described with reference to FIG. 4. The first control unit 104 determines whether or not the video transmission terminal 100 is operating as an STA (step S101). When the video transmission terminal 100 is operating as an STA, the video transmission terminal 100 is participating in the first network.

In step S101, when the video transmission terminal 100 is operating as an AP, the process shown, in FIG. 4 ends. In this case, the first control unit 104 causes the video transmission terminal 100 to continue the operation as an AP by controlling the first communication session control unit 102.

In step S101, when the video transmission terminal 100 is operating as an STA, the first control unit 104 monitors the first communication unit 101 and determines whether or not the video transmission information has been received from the video reception terminal 200 operating as an STA (step S102). The first control unit 104 receives the video transmission information transmitted by the video reception terminal 200 by controlling the first communication unit 101.

In step S102, when the video transmission information is received, the first control unit 104 may confirm whether or not a terminal that has transmitted the video transmission information is the video reception terminal 200. For example, when the video transmission terminal 100 participates in the first network created by the AP, the video transmission terminal 100 searches for the AP. The video transmission terminal 100 receives a response of the search from another terminal. This response includes an identifier of the terminal that has transmitted the response, information indicating that the terminal is the video transmission terminal 100 or the video reception terminal 200, and information indicating that the terminal is an AP or an STA. Alternatively, the video transmission terminal 100 may receive the above information from another terminal when the other terminal performs searching for an AP while the video transmission terminal 100 is participating in the first network created by the AP.

Alternatively, the video reception terminal 200 may broadcast information for searching for the video transmission terminal 100. This information includes an identifier of the terminal that performs searching, information indicating that the terminal is the video transmission terminal 100 or the video reception terminal 200, and information indicating that the terminal is an AP or an STA. The video transmission terminal 100 receives this information.

The identifier of the terminal, the information indicating that the terminal is the video transmission terminal 100 or the video reception terminal 200, and the information indicating that the terminal is an AP or an STA are stored in the video transmission terminal 100. The video transmission information includes an identifier of the terminal which has transmitted the video transmission information. When the video transmission information has been received, the first control unit 104 confirms whether or not the terminal that has transmitted the video transmission information is the video reception terminal 200 operating as an STA on the basis of such information.

In step S102, when the video transmission information has not been received, the first control unit 104 performs the determination in step S102 again. In step S102, when the video transmission information has been received, the first control unit 104 causes the video transmission terminal 100 to be disconnected from the first network by controlling the first communication session control unit 102 (step S103). Accordingly, the video transmission terminal 100 is disconnected from the first network. In step S103, the first communication session control unit 102 transmits information indicating that the video transmission terminal 100 is to be disconnected from the first, network to the AP using the first communication unit 101. Accordingly, a state in which the video transmission terminal 100 is participating in the first network is released.

After the process of step S103 is performed, the first control unit 104 causes the video transmission terminal 100 to start the operation as an AP and causes the first communication session control unit 102 to create the second network by controlling the first communication session control unit 102 (step S104). Thus, the first communication session control unit 102 creates the second network. The creation of the second network includes generation of an SSID that is an identifier of a wireless network, and a pass phrase which is an encryption key. In step S104, the first control unit 104 causes the video transmission terminal 100 to end the operation as an STA by causing the video transmission terminal 100 to start the operation as an AP.

After the process of step S104 is performed, the first control unit 104 causes the first video session control unit 103 to establish the video session with the video reception terminal 200 that has transmitted the video transmission information (step S105). Accordingly, the first video session control unit 103 establishes the video session with the video reception terminal 200 that has transmitted the video transmission information. In step S105, a plurality of messages regarding a determination of a video format and an audio format that are used by the video transmission terminal 100 and the video reception terminal 200 are exchanged. Further, in step S105, a plurality of messages regarding a confirmation as to whether or not preparation for video transmission has been completed in the video transmission terminal 100 and the video reception, terminal 200 are exchanged. In step S105, the first video session control unit 103 performs transmission and reception of the messages using the first communication unit 101.

After the process of step S105 is performed, the first control unit 104 causes the first video session control unit 103 to transmit a video (step S106). Accordingly, the first video session control unit 103 transmits the video to the video reception terminal 200 with which the video session, has been established, by using the first communication unit 101. That is, after the second network is generated and the video session is established, the first video session, control unit 103 transmits the video to the video reception terminal 200 with which the video session has been established, by using the first communication unit 101.

After the process of step S106 is performed, the process shown in FIG. 4 ends. In this case, the first control unit 104 causes the video transmission terminal 100 to continue the operation as an AP by controlling the first communication session control unit 102.

After the process shown in FIG. 4 ends, another video reception terminal 200 may participate in the second network. When a plurality of video reception terminals 200 participating in the second network request the video transmission terminal 100 to provide the same video, the video transmission terminal 100 transmits the video to the plurality of video reception terminals 200.

Figure 5:
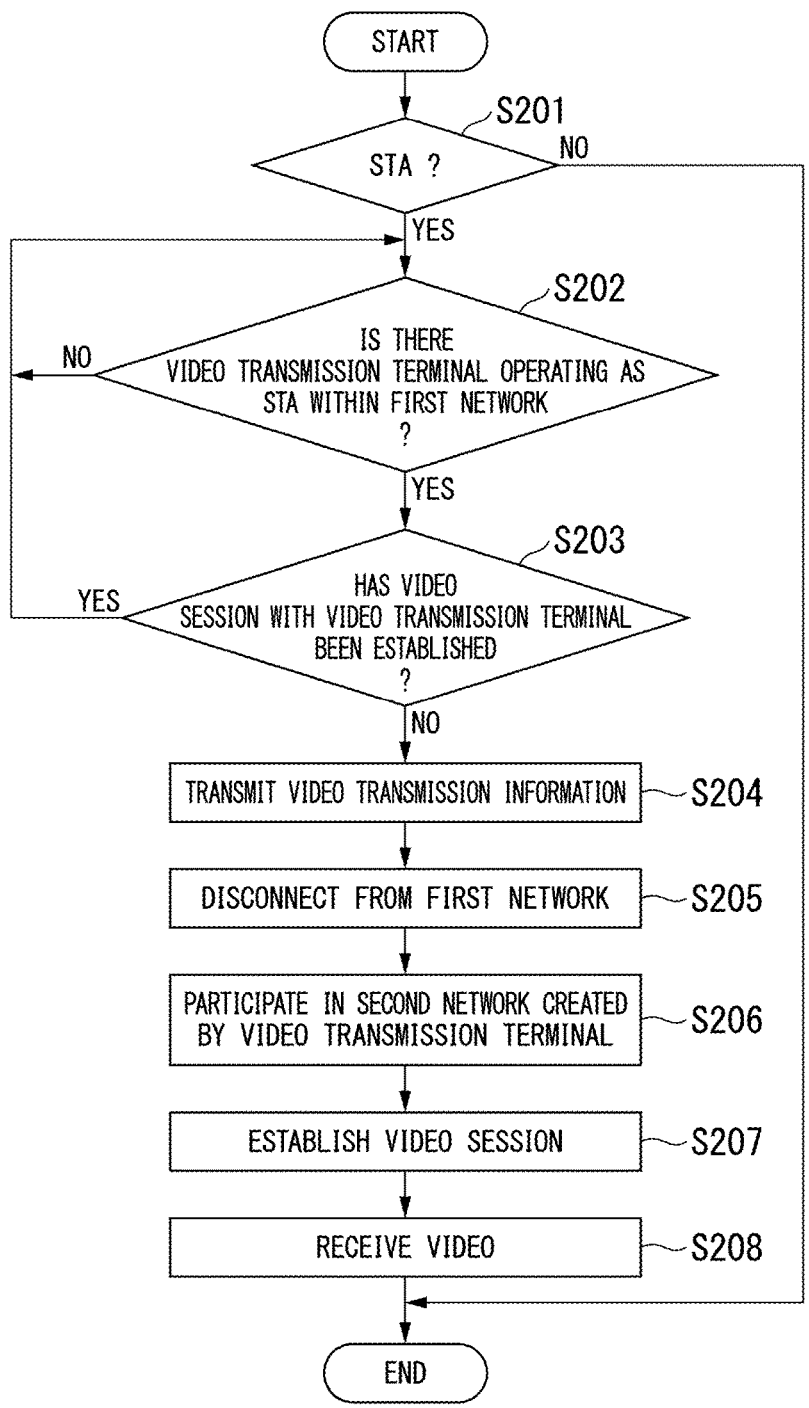
FIG. 5 is a flowchart showing a procedure of an operation of the video reception terminal in the first embodiment of the present invention.

FIG. 5 shows a procedure of an operation of the video reception terminal 200. In FIG. 5, an operation while the video reception terminal 200 operates as an STA is mainly shown. The video reception terminal 200 can operate as an AP. Further, the video reception terminal 200 may perform an operation using Miracast (registered trademark).

An operation of the video reception terminal 200 will be described with reference to FIG. 5. The second control unit 204 determines whether or not the video reception terminal 200 is operating as an STA (step S201). When the video reception terminal 200 is operating as an STA, the video reception terminal 200 is participating in the first network.

In step S201, when the video reception terminal 200 is operating as an AP, the process shown in FIG. 5 ends. In this case, the second control unit 204 causes the video reception terminal 200 to continue the operation as an AP by controlling the second communication session control unit 202.

In step S201 when the video reception terminal 200 is operating as an STA, the second control unit 204 determines whether or not there is the video transmission terminal 100 operating as an STA within the first network in which the video reception terminal 200 is participating (step S202).

For example, when the video reception terminal 200 participates in the first network created by the AP, the video reception terminal 200 searches for the AP. In this case, the video reception terminal 200 receives a response of the search from another terminal. This response includes an identifier of the terminal that has transmitted the response, information indicating that the terminal is the video transmission terminal 100 or the video reception terminal 200, and information indicating that the terminal is an AP or an STA. Alternatively, the video reception terminal 200 may receive the above information from another terminal when the other terminal performs searching for an AP while the video reception, terminal 200 is participating in the first network created by the AP.

Alternatively, the video transmission terminal 100 may broadcast information for searching for the video reception terminal 200. This information includes an identifier of the terminal that performs searching, information indicating that the terminal is the video transmission terminal 100 or the video reception terminal 200, and information indicating that the terminal is an AP or an STA. The video reception terminal 200 receives this information.

The identifier of the terminal, the information indicating that the terminal is the video transmission terminal 100 or the video reception terminal 200, and the information indicating that the terminal is an AP or an STA are stored in the video reception terminal 200. In step S202, the second control unit 204 determines whether or not there is the video transmission terminal 100 operating as an STA within the first network on the basis of such information.

In step S202, when there is not the video transmission, terminal 100 operating as an STA within the first network, the second control unit 204 performs the determination in step S202 again. In step S202, when there is the video transmission terminal 100 operating as an STA within the first network, the second control unit 204 determines whether or not a video session with the video transmission, terminal 100 has been established (step S203).

In step S203, the second control unit 204 determines whether or not the video session has been successfully established. When the video session has been successfully established, the second control unit 204 can determine that the video session with the video transmission terminal 100 has been established. In one of the eases in which the establishment of the video session with the video transmission terminal 100 is not executed, the establishment of the video session with the video transmission terminal 100 has failed, and the establishment of the video session with the video transmission terminal 100 is being executed, the second control unit 204 can determine that the establishment of the video session with the video transmission terminal 100 has not been completed.

In step S203, when the video session with the video transmission terminal 100 has been established, the second control unit 204 performs the determination in step S202 again. In step S203, when the video session with the video transmission terminal 100 has not been established, the second control unit 204 transmits the video transmission information to the video transmission terminal 100 using the second communication unit 201 (step S204). For example, the video transmission information is stored in a memory of the video reception terminal 200. In step S204, the video transmission information is transmitted. The video transmission terminal 100 to which the video transmission information is transmitted in step S204 is the video transmission terminal 100 in which the video session is determined not to have been completed in step S203.

After the process of step S204 is performed, the second control unit 204 causes the video reception terminal 200 to be disconnected from the first network by controlling the second communication session control unit 202 (step S205). Thus, the video reception terminal 200 is disconnected from the first network. In step S205, the second communication session control unit 202 transmits information indicating that the video reception terminal 200 is to be disconnected from the first network to the AP using the second communication unit 201. Thus, a state in which the video reception terminal 200 is participating in the first network is released.

After the process of step S205 is performed, the second control unit 204 causes the video reception terminal 200 to participate in the second network by controlling the second communication session control unit 202 (step S206). In step S206, the second communication session control unit 202 transmits a participation request to the video transmission terminal 100 that has received the video transmission information by using the second communication unit 201.

After the process of step S206 is performed, the second control unit 204 causes the second video session control unit 203 to establish the video session with the video transmission terminal 100 that has received the video transmission information (step S207). Accordingly, the second video session control unit 203 establishes the video session with the video transmission terminal 100 that has received the video transmission information. In step S207, a plurality of messages are exchanged, similarly to step S105. In step S207, the second video session control unit 203 performs transmission and reception of the messages using the second communication unit 201.

After the process of step S207 is performed, the second control unit 204 causes the second video session control unit 203 to receive a video (step S208). Accordingly, the second video session control unit 203 receives a video from the video transmission terminal 100 with which the video session has been established, using the second communication unit 201. That is, after the video reception terminal 200 participates in the second network and the video session has been established, the second video session control unit 203 receives a video from the video transmission terminal 100 with which the video session has been established, using the second communication unit 201.

After the process of step S208 is performed, the process shown in FIG. 5 ends. In this case, the second control unit 204 causes the video reception terminal 200 to continue the operation as an STA by controlling the second communication session control unit 202.

Figure 6:
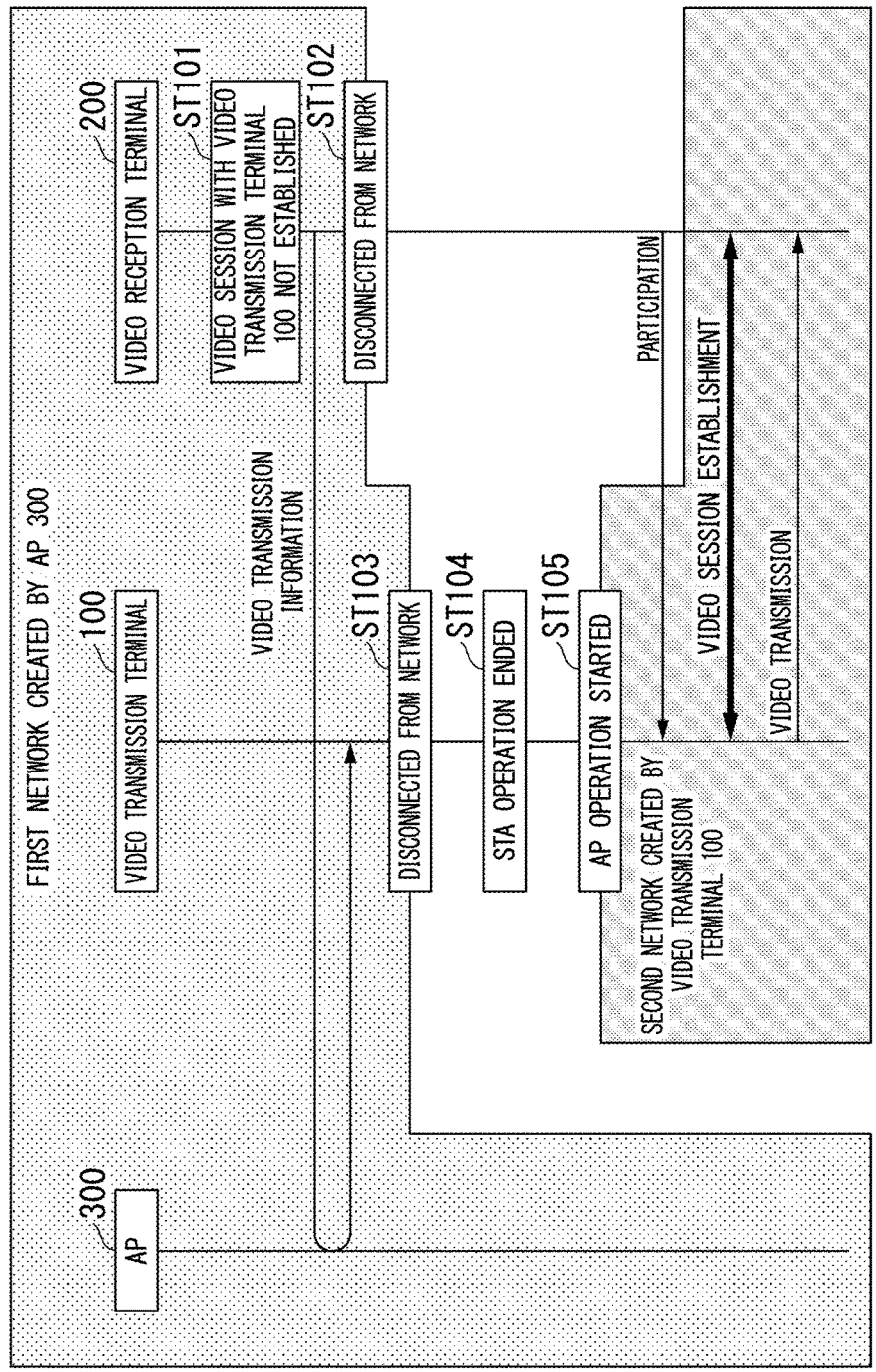
FIG. 6 is a sequence diagram showing a procedure of communication in the first, embodiment of the present invention.

FIG. 6 shows a communication procedure. An operation of each terminal will be described with reference to FIG. 6.

In FIG. 6, the video transmission terminal 100, the video reception terminal 200, and the AP 300 participate in the first network created by the AP 300 as an STA. The video reception terminal 200 has not established the video session with the video transmission terminal 100 (state ST101).

The video reception terminal 200 transmits the video transmission information in step S204. Thereafter, the video reception terminal 200 is disconnected from the first network in step S205 (state ST102).

The video transmission information transmitted by the video reception terminal 200 is transmitted to the video transmission terminal 100 via the AP 300. When the video transmission information is received (corresponding to step S102), the video transmission terminal 100 is disconnected from the first network in step S103 (state ST103). Thereafter, the video transmission terminal 100 ends the operation as the STA in step S104 (state ST104), and starts the operation as the AP (state ST105). Thus, the video transmission terminal 100 creates the second network.

The video reception terminal 200 participates in the second network in step S206. The video transmission terminal 100 and the video reception terminal 200 establish a video session in steps S105 and S207. After the second network is created and the video session is established, the video transmission terminal 100 transmits the video to the video reception terminal 200 in step S106. After the video reception terminal 200 participates in the second network and the video session is established, the video reception terminal 200 receives the video from the video transmission terminal 100 in step S208.

According to the first embodiment, the video communication system 10 includes the video transmission terminal 100 and the video reception terminal 200. The video transmission terminal 100 includes the first communication unit 101, the first communication session control unit 102, the first video session control unit 103, and the first control unit 104. The first control unit 104 executes the first transmission terminal process (step S103), the second transmission terminal process (step S104), and the third transmission terminal process (step S305). The video reception terminal 200 includes the second communication unit 201, the second communication session control unit 202, the second video session control unit 203 and the second control unit 204. The second control unit 204 executes the first reception terminal process (step S204), the second reception terminal process (step S205), the third reception terminal process (step S206), and the fourth reception terminal process (step S207).

According to the first embodiment, the communication method of the video transmission terminal 100 includes the first step (step S103), the second step (step S104), the third step (step S105), and the fourth step (step S106).

While the video transmission terminal 100 operates as an STA and the video transmission terminal 100 participates in the first network, the video transmission terminal 100 is disconnected from the first network in the first step in a case in which the video transmission information regarding video transmission is received from the video reception terminal 200. After the video transmission terminal 100 is disconnected from the first network, the video transmission terminal 100 starts an operation as an AP and the video transmission terminal 100 creates the second network in the second step. In the third step, the video transmission terminal 100 establishes a video session with the video reception terminal 200. In the fourth step, after the video session is established, the video transmission terminal 100 transmits a video to the video reception terminal 200 with which the video session has been established.

According to the first embodiment, the communication method of the video reception terminal 200 includes the first step (step S204), the second step (step S205), the third step (step S206), the fourth step (step S207), and the fifth step (step S208).

While the video reception terminal 200 operates as an STA and the video reception terminal 200 participates in the first network, the video reception terminal 200 transmits video transmission information regarding video transmission to the video transmission terminal 100 in the first step. After the video transmission information is transmitted, the video reception terminal 200 is disconnected from the first network in the second step. After the video reception terminal 200 is disconnected from the first network, the video reception terminal 200 participates in the second network in the third step. In the fourth step, the video reception terminal 200 establishes the video session with the video transmission terminal 100. In the fifth step, after the video session is established, the video reception terminal 200 receives a video from the video transmission terminal 100 with which the video session has been established.

According to the first embodiment the program causes a computer of the video transmission terminal 100 to execute the first step (step S103), the second step (step S104), the third step (step S105), and the fourth step (step S106).

According to the first embodiment, the program causes a computer of the video reception terminal 200 to execute the first step (step S204), the second step (step S205), the third step (step S206), the fourth step (step S207), and the fifth step (step S208).

In the first embodiment, when the video transmission information is received from the video reception terminal 200, the video transmission terminal 100 becomes the AP and creates the second network, and therefore, the video transmission terminal 100 enters a state in which, the video transmission terminal 100 can transmit a video. Therefore, a new network can be created so that the video transmission terminal 100 and the video reception terminal 200 can directly transmit a video without going via an existing AP.

When another video reception terminal 200 different from the video reception terminal 200 participating in the second network participates in the second network, as a station, and a plurality of video reception terminals 200 request the video transmission terminal 100 to provide a video, the video transmission terminal 100 can directly transmit the video to the plurality of video reception terminals 200. Therefore, transmission efficiency in a case where the plurality of video reception terminals 200 perform video reception is high.

While the video transmission terminal 100 and the video reception terminal 200 connect to a general AP before a new network is created, the video transmission terminal 100 and the video reception terminal 200 can share information on the new network or video communication. However, when the video transmission terminal 100 and the video reception terminal 200 create a new network using Miracast (registered trademark), a series of operations of Miracast (registered trademark) are performed without the video transmission terminal 100 and the video reception terminal 200 using such information. Therefore, this takes time.

In the first embodiment, it is not necessary for the video transmission, terminal 100 and the video reception terminal 200 to determine which of the video transmission terminal 100 and the video reception terminal 200 becomes the AP. Thus, it is possible to shorten the time taken to start video transmission.

(Second Embodiment)

In a second embodiment of the present invention, the video transmission terminal 100 is used. Further, the video reception terminal 200 is replaced with a video reception terminal 200a shown in FIG. 7.

Figure 7:
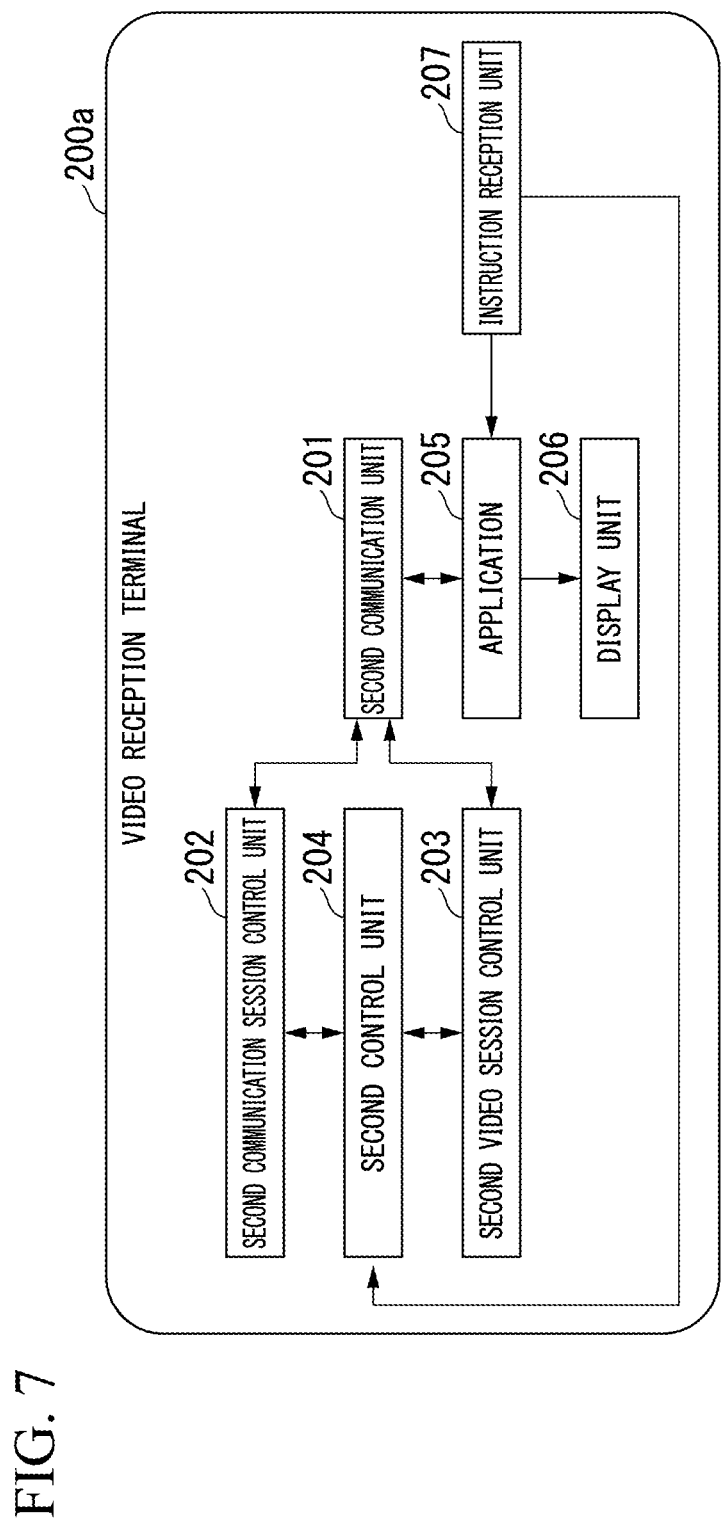
FIG. 7 is a block diagram showing a configuration of a video reception terminal of a second embodiment of the present invention.

FIG. 7 shows a configuration of the video reception terminal 200a. As shown in FIG. 7, the video reception terminal 200a includes a second communication unit 201, a second communication session control unit 202, a second video session control unit 203, a second control unit 204, an application 205, a display unit 206, and an instruction reception unit 207.

Differences between the configuration shown in FIG. 7 and the configuration shown in FIG. 3 will be described. An application 205 is software for video display. The application 205 displays a video received from the video transmission terminal 100 by controlling the display unit 206, The display unit 206 is a display. The display unit 206 may have a configuration of being independent of the video reception terminal 200a. Accordingly, the display unit 206 is not essential to the video reception terminal 200a.

The instruction reception unit 207 receives an instruction to start the application 205 from the user. Further, the instruction reception unit 207 receives an instruction to select one of one or more video transmission terminals 100 with which the video session has been established from the user. One video transmission terminal 100 is selected by the user, and therefore, the video transmission terminal 100 that transmits the video to be displayed by the application 205 is specified. That is, the video transmission terminal 100 that is a video transmission source is specified. When the instruction reception unit 207 receives an instruction to start the application 205, the instruction reception unit 207 outputs the start instruction to the application 205. The application 205 starts on the basis of the start instruction. When the instruction reception unit 207 receives an instruction to select the video transmission terminal 100, the instruction reception unit 207 outputs terminal information to the second control unit 204. The terminal information indicates a selected video transmission terminal 100. The instruction reception unit 207 may have a configuration of being independent of the video reception terminal 200a. Therefore, the instruction reception unit 207 is not essential to the video reception terminal 200a.

When the application 205 starts, the second control unit 204 transmits the video transmission information to the video transmission terminal 100 using the second communication unit 201 in the first reception terminal process. Between a point in time at which the application 205 has started and a point in time at which the video transmission terminal 100 that transmits the video to be displayed by the application 205 has been specified, the second control unit 204 causes the second video session control unit 203 to perform all processes needed to establish the video session in the fourth reception terminal process. After the video transmission terminal 100 has been specified, the second control unit 204 causes the video reception terminal 200a to be disconnected from the first network by controlling the second communication session control unit 202 in the second reception terminal process.

The configuration shown in FIG. 7 other than in the above respects is the same as that shown in FIG. 3.

The video transmission terminal 100 is different from that in the first embodiment in the following respects. After the first video session control unit 103 completes all of the processes needed to establish the video session, the first control unit 104 causes the video transmission terminal 100 to be disconnected from the first network by controlling the first communication session control unit 102 in the first transmission terminal process. In respects other than the above, the video transmission terminal 100 of the second embodiment is the same as the video transmission terminal 100 of the first embodiment.

Figure 8:
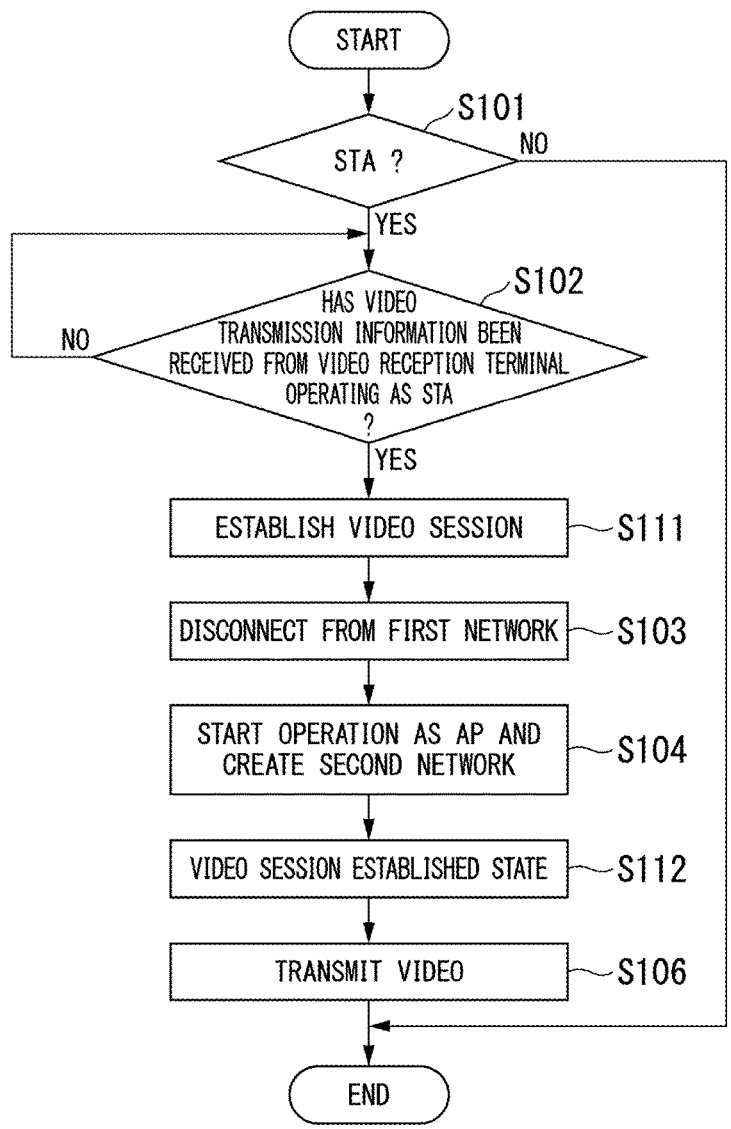
FIG. 8 is a flowchart showing a procedure of an operation of a video transmission terminal of the second embodiment of the present invention.

FIG. 8 shows a procedure of an operation of the video transmission terminal 100. An operation of the video transmission terminal 100 will be described with reference to FIG. 8. Hereinafter, an operation different from the operation shown in FIG. 4 will be described.

In step S302, when the video transmission information is received, the first control unit 104 causes the first video session control unit 103 to establish the video session with the video reception terminal 200a that has transmitted the video transmission information (step S111). The process of step S111 is the same as the process in step S105. In step S111, the first video session control unit 103 performs all of the processes needed to establish the video session.

After the process of step S111 is performed, the process of step S103 is performed. After the process of step S104 is performed, the video transmission terminal 100 enters a state in which the video session has been established (step S112). It step S112, the first control unit 104 changes a flag regarding the video session to a value indicating that the video session has been established. After the video transmission terminal 100 is disconnected from the first network, the first video session control unit 103 does not perform the process needed to establish the video session. After the process of step S112 is performed, the process of step S106 is performed.

In respects other than the above, the operation shown in FIG. 8 is the same as the operation, shown, in FIG. 4.

Figure 9:
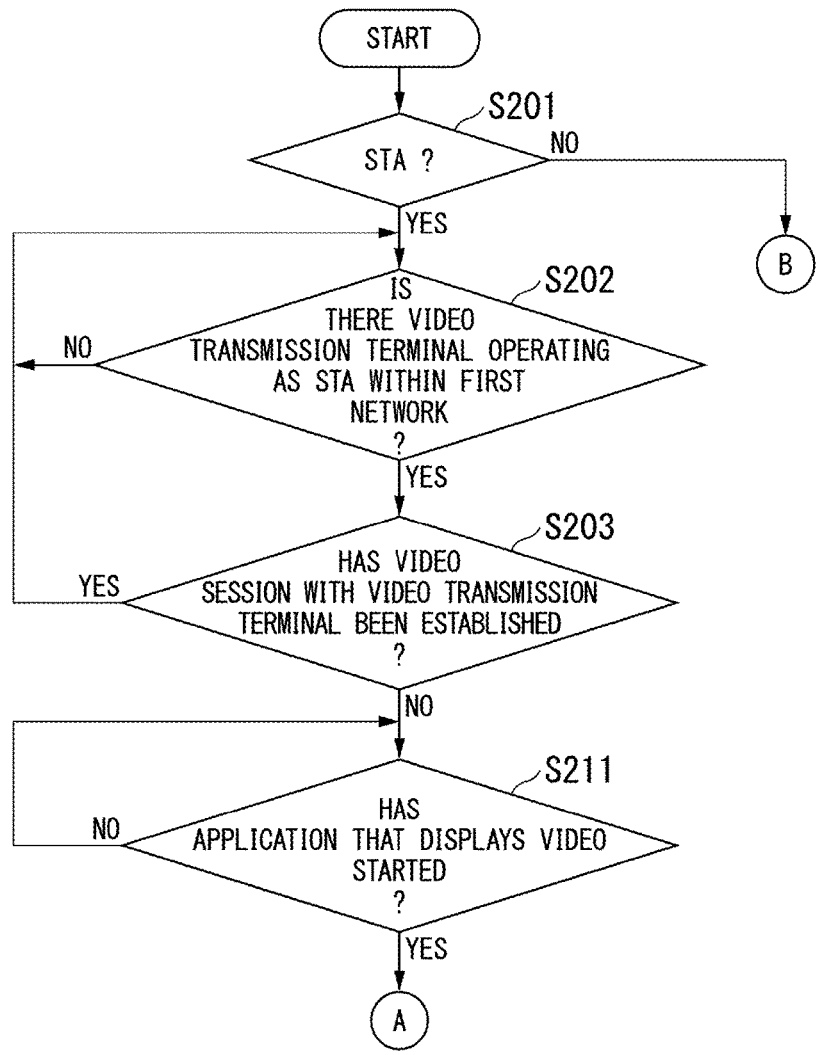
FIG. 9 is a flowchart showing a procedure of an operation of the video reception terminal of the second embodiment of the present invention.
Figure 10:
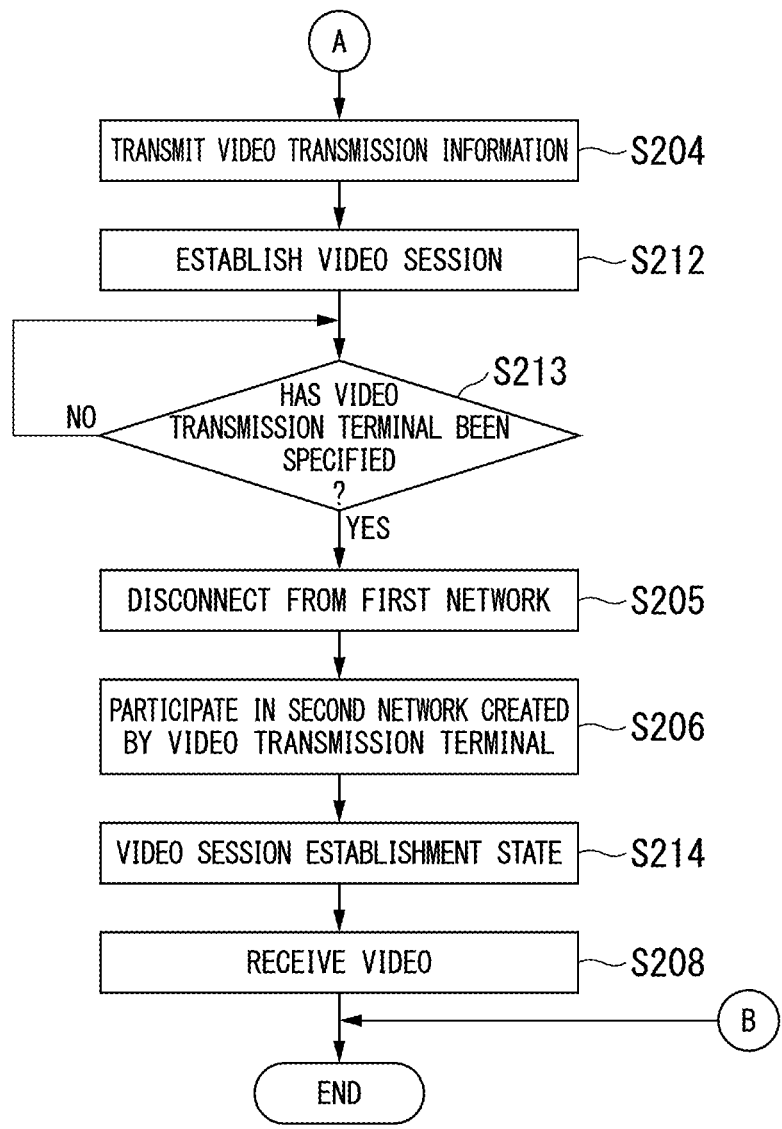
FIG. 10 is a flowchart showing a procedure of an operation of the video reception terminal of the second embodiment of the present invention.

FIGS. 9 and 10 show a procedure of an operation of the video reception terminal 200a. An operation of the video reception terminal 200a will be described with reference to FIGS. 9 and 10. Hereinafter, an operation different from the operations shown in FIG. 5 will be described.

In step S203, when the video session with the video transmission terminal 100 has not been established, the second control unit 204 determines whether or not the application 205 has started (step S211).

In step S211, when the application 205 has not started, the second control unit 204 performs the determination in step S211 again. In step S211, when the application 205 has started, the process of step S204 is performed. In step S204, the video transmission information is transmitted to one or more video transmission terminals 100. That is, the video transmission information may be transmitted to a plurality of video transmission terminals 100.

After the process of step S204 is performed, the second control unit 204 causes the second video session control unit 203 to establish the video session with the video transmission terminal 100 that has received the video transmission information (step S212). The process of step S212 is the same as the process of step S207. In step S212, the second video session control unit 203 performs all of processes needed to establish the video session. In step S212, the video session with one or more video transmission, terminals 100 is established. That is, the video session with a plurality of video transmission terminals 100 may be established.

After the process of step S212 is performed, the second control unit 204 determines whether or not the video transmission terminal 100 has been specified (step S213). In step S213, the second control unit 204 performs the determination on the basis of the terminal information from the instruction reception unit 207. When the terminal information is not output from the instruction reception unit 207, the second control unit 204 can determine that the video transmission terminal 100 has not been specified. When the terminal information is output from the instruction reception unit 207, the second control unit 204 can determine that the video transmission terminal 100 has been specified.

In step S213, when the video transmission terminal 100 has not been specified, the determination in step S213 is performed again. In step S213, when the video transmission terminal 100 has been specified, the process of step S205 is performed. After the process of step S206 is performed, the video reception terminal 200a enters a state in which the video session has been established (step S214). In step S214, the second control unit 204 changes the flag regarding the video session to a value indicating that the video session has been established. After the video reception terminal 200a is disconnected from the first network, the second video session control unit 203 does not perform the process needed to establish the video session.

After the process of step S214 is performed, the process of step S208 is performed. In step S208, the second control, unit 204 receives a video from the video transmission terminal 100 with which the video session has been established and which is indicated by the terminal information, using the second communication unit 201. That is, in step S208, the video is received from the video transmission terminal 100 specified in step S213.

In the operation shown in FIGS. 9 and 10, the second control unit 204 transmits the video transmission information to the video transmission terminal 100 using the second communication unit 201 after the application 205 has started. The second control unit 204 may transmit the video transmission information to the video transmission terminal 100 using the second communication unit 201 after the instruction to start the application 205 is received and before the application 205 starts.

In respects other than the above, the operation shown in FIGS. 9 and 10 is the same as the operation shown in FIG. 5.

Figure 11:
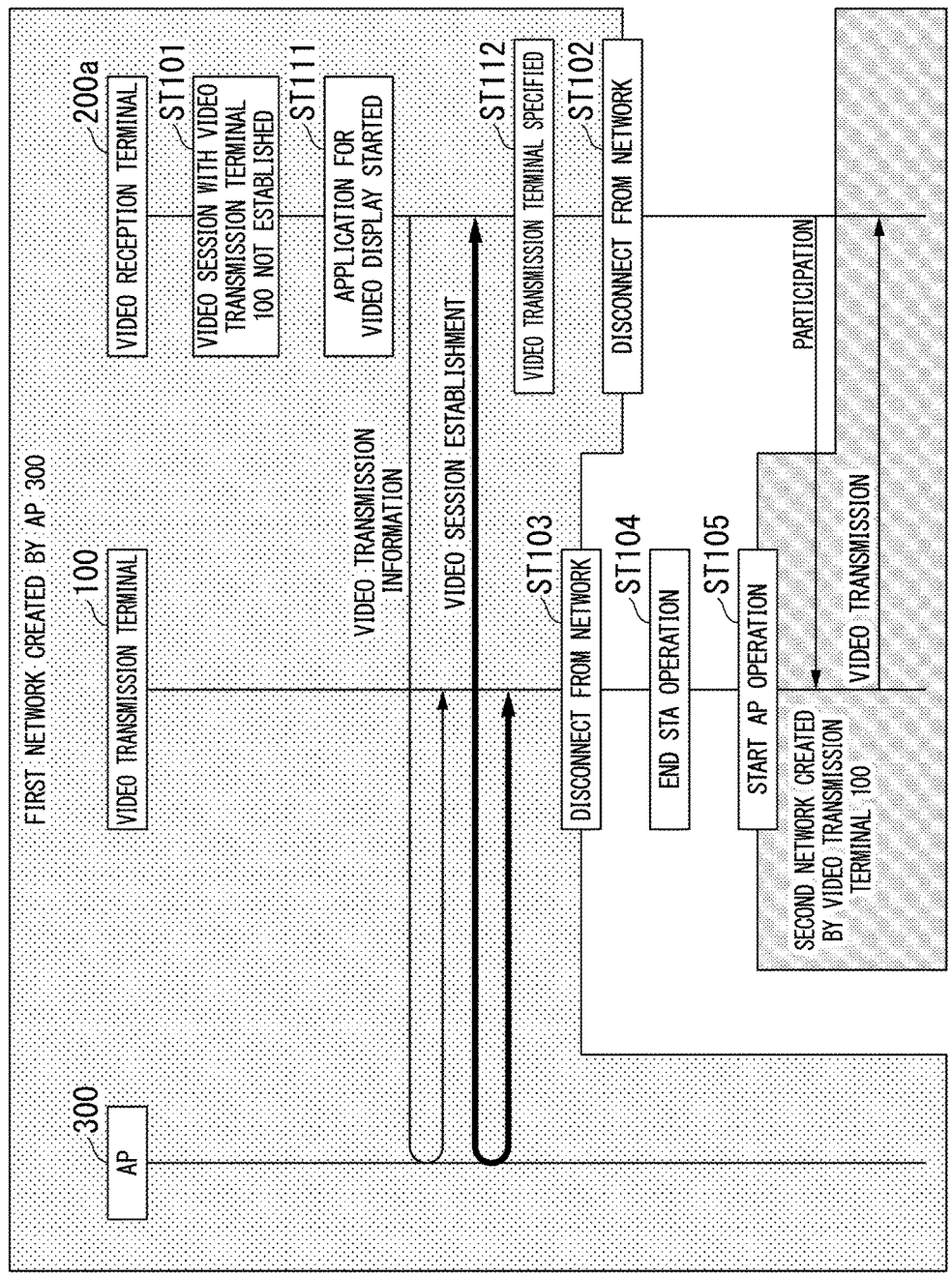
FIG. 11 is a sequence diagram showing a procedure of communication according to the second embodiment of the present invention.

FIG. 11 shows a procedure of communication. An operation of each terminal will be described with reference to FIG. 11. Hereinafter, differences between the operation shown in FIG. 11 and the operation shown in FIG. 6 will be described.

The video reception terminal 200a does not establish the video session with the video transmission terminal 100 (state ST101). The application 205 starts according to an instruction of the user (state ST111). After the application 205 has started, the video reception terminal 200a transmits the video transmission information in step S204.

The video transmission information transmitted by the video reception terminal 200*a* is transmitted to the video transmission terminal 100 via the AP 300. When the video transmission information has been received (corresponding to step S102), the video transmission terminal 100 establishes the video session in step S111. The video reception terminal 200*a* establishes the video session in step S212. Since the video transmission terminal 100 and the video reception terminal 200*a* participate in the first network, a message for establishment of the video session goes via the AP 300.

After the video session has been established, the video transmission terminal 100 is disconnected from the first network in step S103 (state ST103). After the video session has been established, the video transmission terminal 100 that transmits the video be displayed by the application 205 is specified in the video reception terminal 200*a* (state ST112). After the video transmission terminal 100 has been specified, the video reception terminal 200*a* is disconnected from the first network in step S205 (state ST102).

In respects other than the above, the operation shown in FIG. 11 is the same as the operation shown in FIG. 6.

Before the video transmission terminal 100 is specified, a process of starting the application 205 and a process regarding selection of the video transmission terminal 100 are performed in the video reception terminal 200*a*. Therefore, it takes time to specify the video transmission terminal 100. In the second embodiment, establishment of a video session is completed between a point in time at which the application 205 has started and a point in time at which the video transmission terminal 100 is specified. Therefore, it is possible to shorten the time needed to start video transmission after the video transmission terminal 100 and the video reception terminal 200*a* are disconnected from the first network.

(Third Embodiment)

In a third embodiment of the present invention, the video transmission terminal 100 and the video reception terminal 200 are used.

In the video transmission terminal 100, the following respects are different from those in the first embodiment. In the first transmission terminal process, the first control unit 104 transmits access point information (hereinafter abbreviated as AP information) to the video reception terminal 200 that has transmitted the video transmission information by controlling the first communication unit 101. The AP information indicates that the video transmission terminal 100 becomes the AP. After the AP information is transmitted, the first control unit 104 causes the video transmission terminal 100 to be disconnected from the first network by controlling the first communication session control unit 102 in the first transmission terminal process. In respects other than the above, the video transmission terminal 100 of the third embodiment is the same as the video transmission, terminal 100 of the first embodiment.

The video reception terminal 200 is different from that in the first embodiment in the following respects. After the AP information is received, the second control unit 204 causes the video reception terminal 200 to be disconnected from the first network by controlling the second communication session control unit 202 in the second reception terminal process. In respects other than the above, the video reception terminal 200 of the third embodiment is the same as the video reception terminal 200 of the first embodiment.

Figure 12:
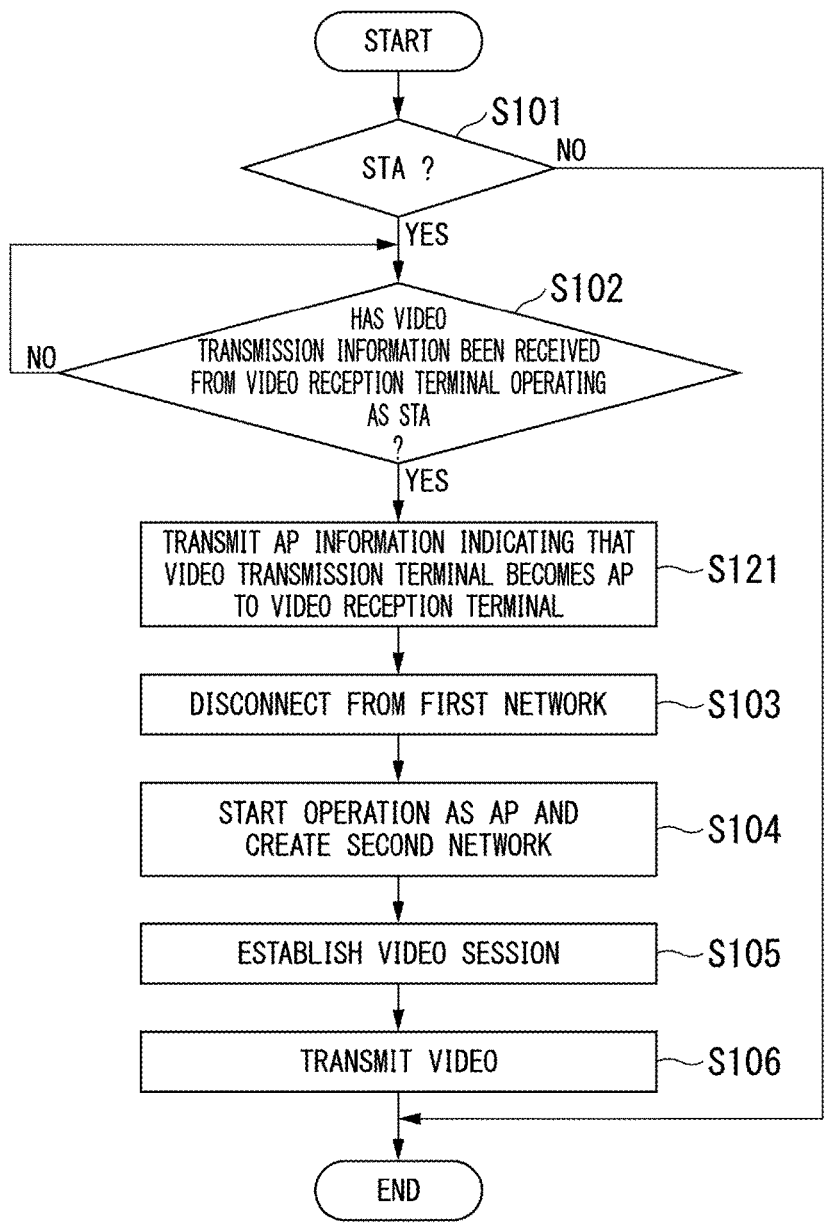
FIG. 12 is a flowchart showing a procedure of an operation of the video transmission terminal of a third embodiment of the present invention.

FIG. 12 shows a procedure of an operation of the video transmission terminal 100. An operation of the video transmission terminal 100 will be described with reference to FIG. 12. Hereinafter, an operation different from the operation shown in FIG. 4 will be described.

In step S102, when the video transmission information is received, the first control unit 104 transmits AP information to the video reception terminal 200 that has transmitted the video transmission information by controlling the first communication unit 101 (step S121). For example, the AP information is stored in a memory in the video transmission terminal 100. In step S121, the AP information is transmitted. After the process of step S121 is performed, the process of step S103 is performed. That is, after the AP information is transmitted, the video transmission terminal 100 is disconnected from the first network.

In respects other than the above, the operation shown in FIG. 12 is the same as the operation shown in FIG. 4.

Figure 13:
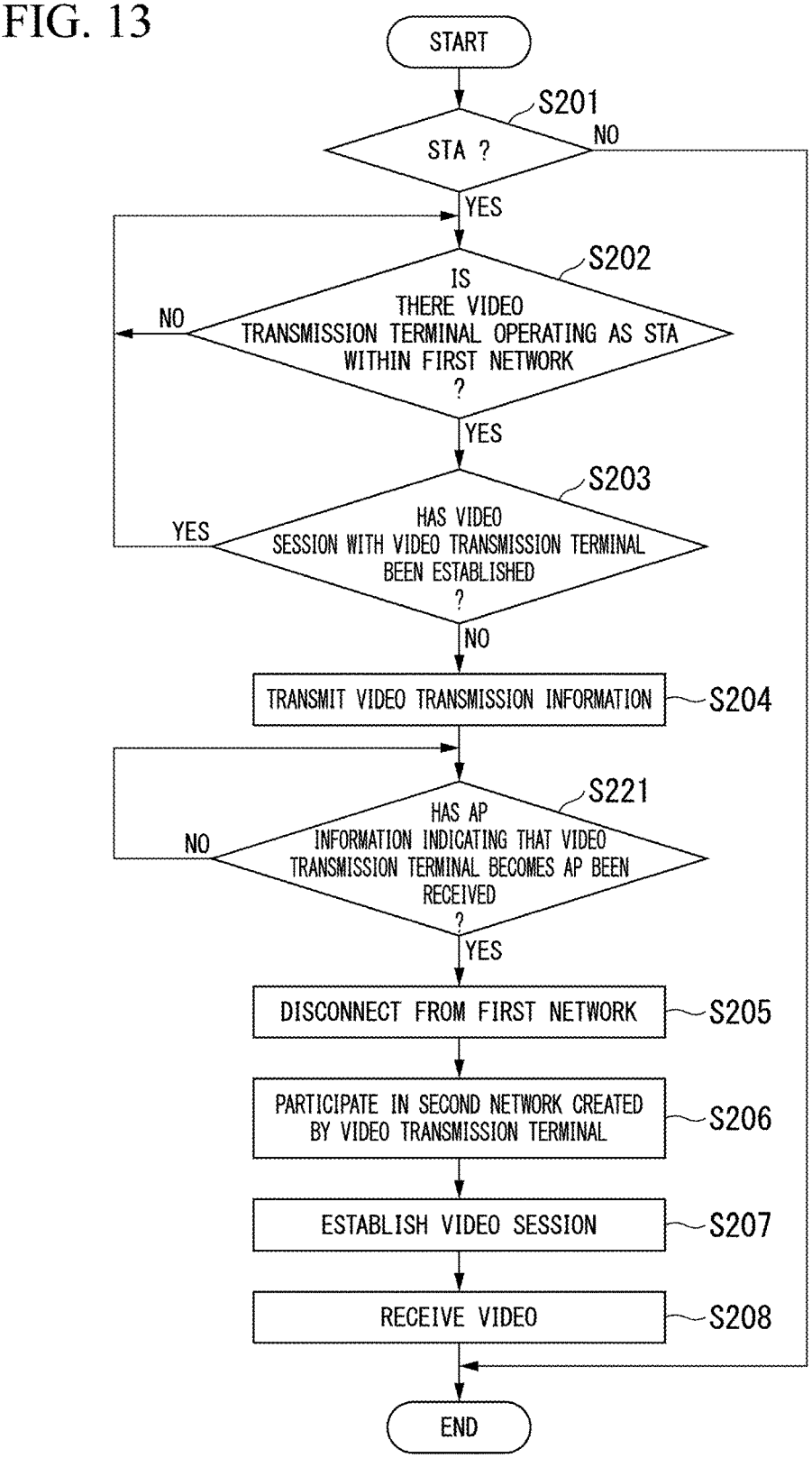
FIG. 13 is a flowchart showing a procedure of an operation of the video reception terminal of the third embodiment of the present invention.

FIG. 13 shows a procedure of an operation of the video reception terminal 200. An operation of the video reception terminal 200 will be described with reference to FIG. 13. Hereinafter, an operation different from the operation shown in FIG. 5 will be described.

After the process of step S204 has been performed, the second control unit 204 monitors the second communication unit 201 and determines whether or not the AP information has been received from the video transmission terminal 100 (step S221). The second control unit 204 controls the second communication unit 201 such that the AP information transmitted by the video transmission terminal 100 is received.

In step S221, when the AP information has not been received, the determination in step S221 is performed again. When the AP information has been received in step S221, the process of step S205 is performed. That is, after the AP information has been received, the video reception terminal 200 is disconnected from the first network. After the video transmission information has been transmitted and before the AP information is received, the video reception terminal 200 may be disconnected from the first network.

Figure 14:
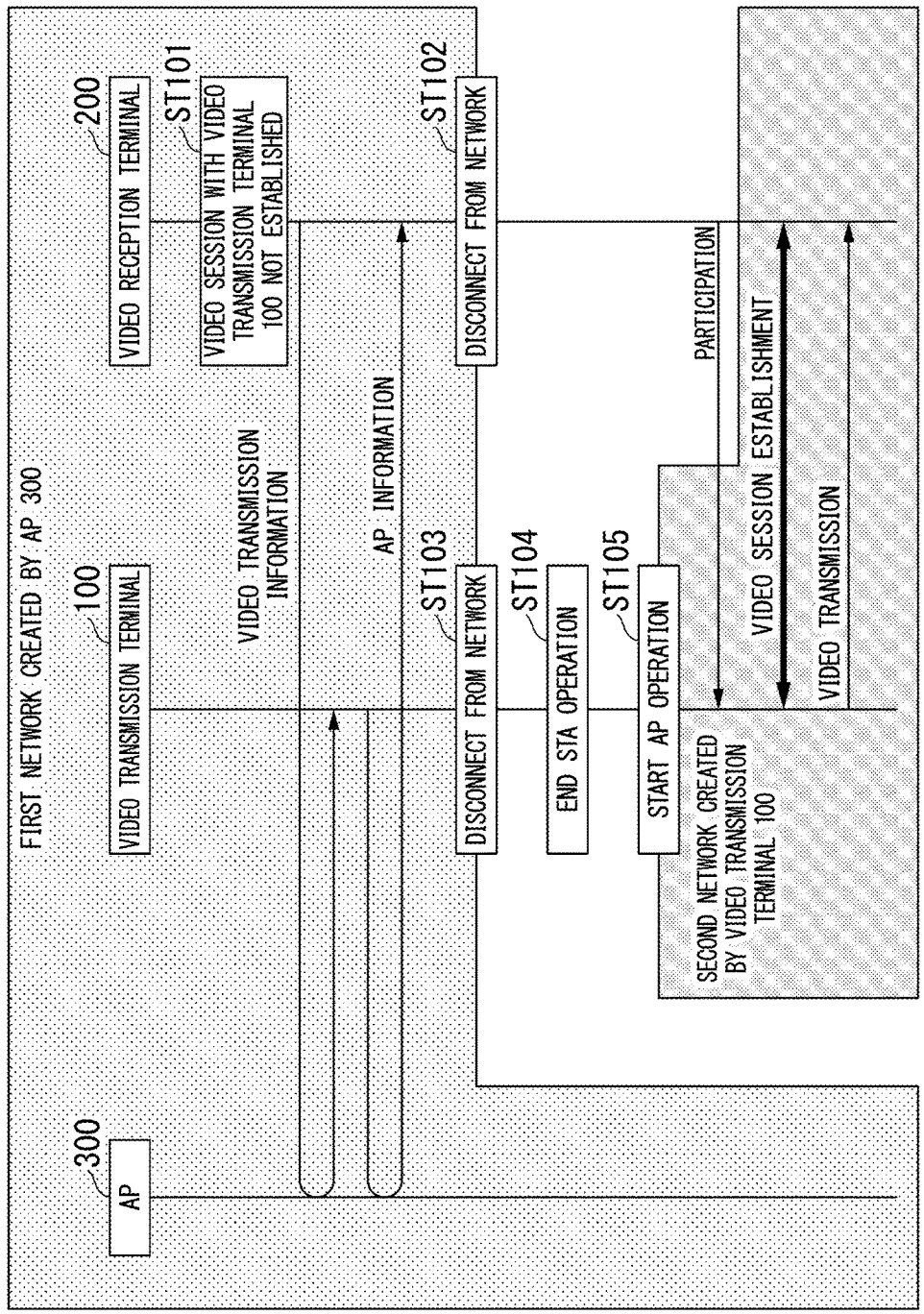
FIG. 14 is a sequence diagram showing a procedure of communication in the third embodiment of the present invention.

FIG. 14 shows a procedure of communication. An operation of each terminal will be described with reference to FIG. 14. Hereinafter, differences between the operation shown in FIG. 14 and the operation shown in FIG. 6 will be described.

When the video transmission information has been received, the video transmission terminal 100 transmits the AP information to the video reception terminal 200 in step S121. The AP information transmitted by the video transmission terminal 100 is transmitted to the video reception terminal 200 via the AP 300.

After the AP information has been transmitted, the video transmission terminal 100 is disconnected from the first network in step S103 (state ST103). When the AP information has been received (corresponding to step S221), the video reception terminal 200 is disconnected from the first network in step S205 (state ST102).

In the third embodiment, the video transmission terminal 100 that has received the video transmission information transmits the AP information to the video reception terminal 200. Accordingly, the video reception terminal 200 can recognize that the video transmission terminal 100 becomes the AP. Therefore, it is not necessary for the video transmission terminal 100 and the video reception terminal 200 to determine which of the video transmission terminal 100 and the video reception terminal 200 becomes the AP. Thus, it is possible to shorten the time taken to start video transmission.

For example, in some STAs such as smart phones, a search period when the AP is searched for is not constant. In the STA, when the AP is not found through one search, the search period may become longer than a previous search period. The search period rapidly becomes longer due to a continuing situation in which the AP is not found. When the video reception terminal 200 is such an STA, the following situation is likely to occur. For example, when the video transmission terminal 100 is in communication with a terminal different from the video reception terminal 200 as necessary after the video transmission terminal 100 receives the video transmission information, the start of the operation as an AP in the video transmission terminal 100 may be delayed for some reason. When the video reception terminal 200 starts an operation as the STA and searches for the AP, the AP is not immediately found and a search period becomes longer. Therefore, after the video transmission terminal 100 starts the operation as the AP, the AP is likely to be found by the video reception terminal 200 after a delay, However, in the third embodiment, the video transmission terminal 100 transmits the AP information such that the video reception terminal 200 can recognize a timing at which the video transmission terminal 100 starts an operation as the AP. Therefore, when the AP information is received, the video reception terminal 200 starts searching for an AP, and therefore, it is possible to prevent the video reception terminal 200 from unnecessarily repeating the search for an AP. That is, it is possible to prevent discovery of the AP from being delayed due to a search period becoming longer. Therefore, it is possible to shorten the time needed to start the video transmission.

(Fourth Embodiment)

In a fourth embodiment of the present invention, a video transmission terminal 100 and a video reception terminal 200 we used.

In the video transmission terminal 100, the following respects are different from those in the first embodiment. In the first transmission terminal process, the first control unit 104 transmits network information (hereinafter abbreviated as NW information) to the video reception terminal 200 that has transmitted the video transmission information by controlling the first communication unit 101. The NW information includes at least one of identification information, channel information, and security information. The identification information is intended to identify the second network. For example, the identification information is a network identifier of the second network. The channel information is related to a communication channel that is used in the second network. For example, the channel information is a channel identifier of the communication channel. The security information is related to authentication needed to participate in the second network. For example, the security information is at least one of an authentication scheme, an encryption scheme, and an encryption key. After the NW information is transmitted, the first control unit 104 causes the video transmission terminal 100 to be disconnected from the first network by controlling the first communication session control unit 102 in the first transmission terminal process. In respects other than the above, the video transmission terminal 100 of the fourth embodiment is the same as tire video transmission terminal 100 of the first embodiment.

The video reception terminal 200 is different from that of the first embodiment in the following respects. After the network information is received, the second control unit 204 causes the video reception terminal 200 to be disconnected from the first network by controlling the second communication session control unit 202 in the second reception terminal process. In respects other than the above, the video reception terminal 200 of the fourth embodiment is the same as the video reception terminal 200 of the first embodiment.

Figure 15:
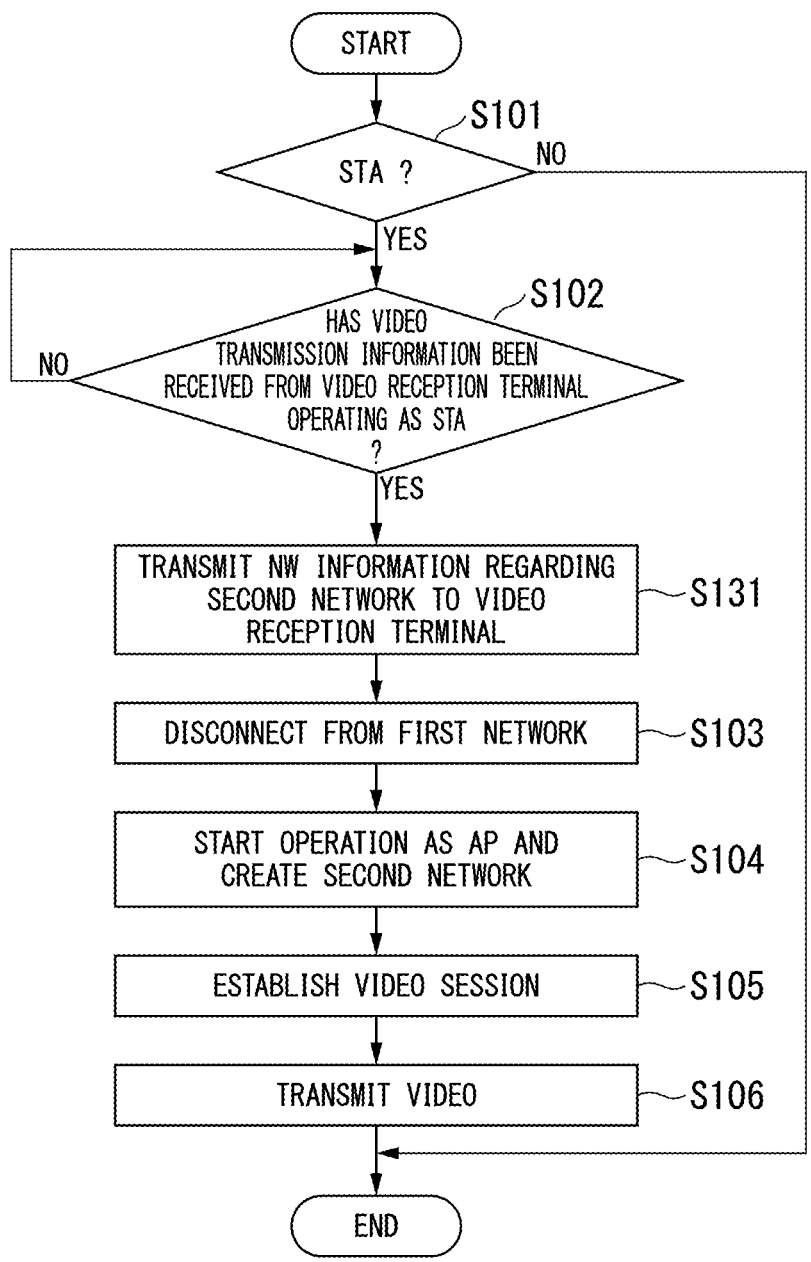
FIG. 15 is a flowchart showing a procedure of an operation of a video transmission terminal of a fourth embodiment of the present invention.

FIG. 15 shows a procedure of an operation of the video transmission terminal 100. An operation of the video transmission, terminal 100 will be described with reference to FIG. 15. Hereinafter, an operation different from the operation shown in FIG. 4 will be described.

In step S102, when the video transmission information is received, the first control unit 104 transmits NW information to the video reception terminal 200 that has transmitted the video transmission information by controlling the first communication unit 101 (step S131). The NW information may include only one of identification information, channel information, and security information. Alternatively, the NW information may include one or more of identification information, channel information, and security information. For example, the NW information is stored in a memory of the video transmission terminal 100. In step S131, this NW information is transmitted. After the process of step S131 is performed, the process of step S103 is performed. That is, after the NW information is transmitted, the video transmission terminal 100 is disconnected from the first network.

In the fourth embodiment, only the video transmission terminal 100 that has received the video transmission information transmits the NW information. The video reception terminal 200 that has received the NW information can recognize that the video transmission terminal 100 that has transmitted the NW information becomes the AP and creates the second network. The NW information may include information indicating that information included in the NW information is information on a new network other than an existing network. The video reception terminal 200 that has received the NW information can recognize that the video transmission terminal 100 that has transmitted the NW information becomes the AP and creates the second network, on the basis of this information.

In respects other than the above, the operation shown in FIG. 15 is the same as the operation shown in FIG. 4.

Figure 16:
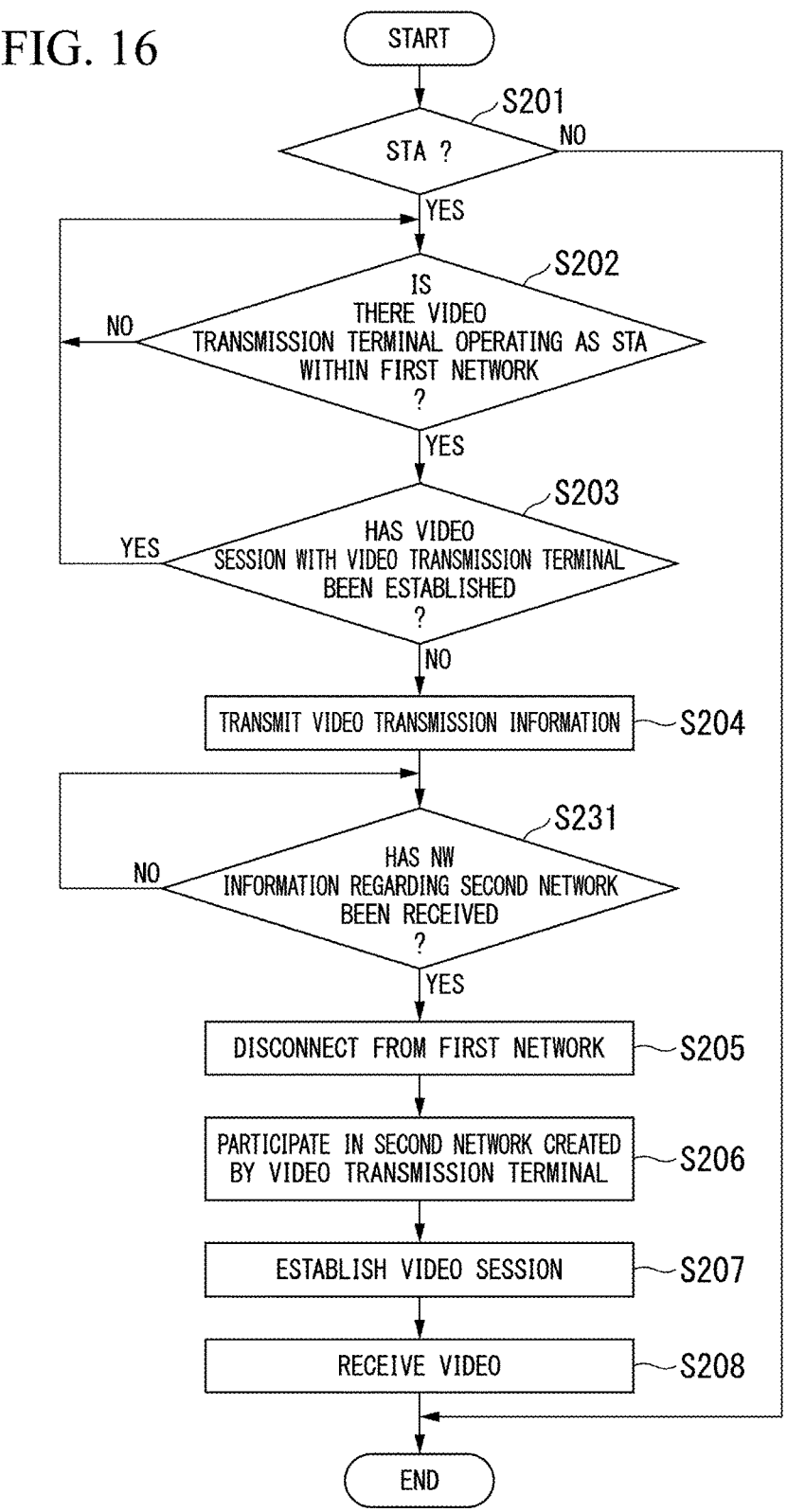
FIG. 16 is a flowchart showing a procedure of an operation of a video reception terminal of the fourth embodiment of the present invention.

FIG. 16 shows a procedure of an operation of the video reception terminal 200. An operation of the video reception terminal 200 will be described with reference to FIG. 16. Hereinafter, an operation different from the operation shown in FIG. 5 will be described.

After the process of step S204 has been performed, the second control unit 204 monitors the second communication unit 201 and determines whether or not the NW information has been received from the video transmission terminal 100 (step S231). The second control unit 204 controls the second communication unit 201 such that the NW information transmitted by the video transmission terminal 100 is received.

In step S231, when the NW information has not been received, the determination in step S231 is performed again. When the NW information has been received in step S231, the process of step S205 is performed. That is, after the NW information has been received, the video reception terminal 200 is disconnected from the first network. After the video transmission information has been transmitted and before the NW information is received, the video reception terminal 200 may be disconnected from the first network.

Figure 17:
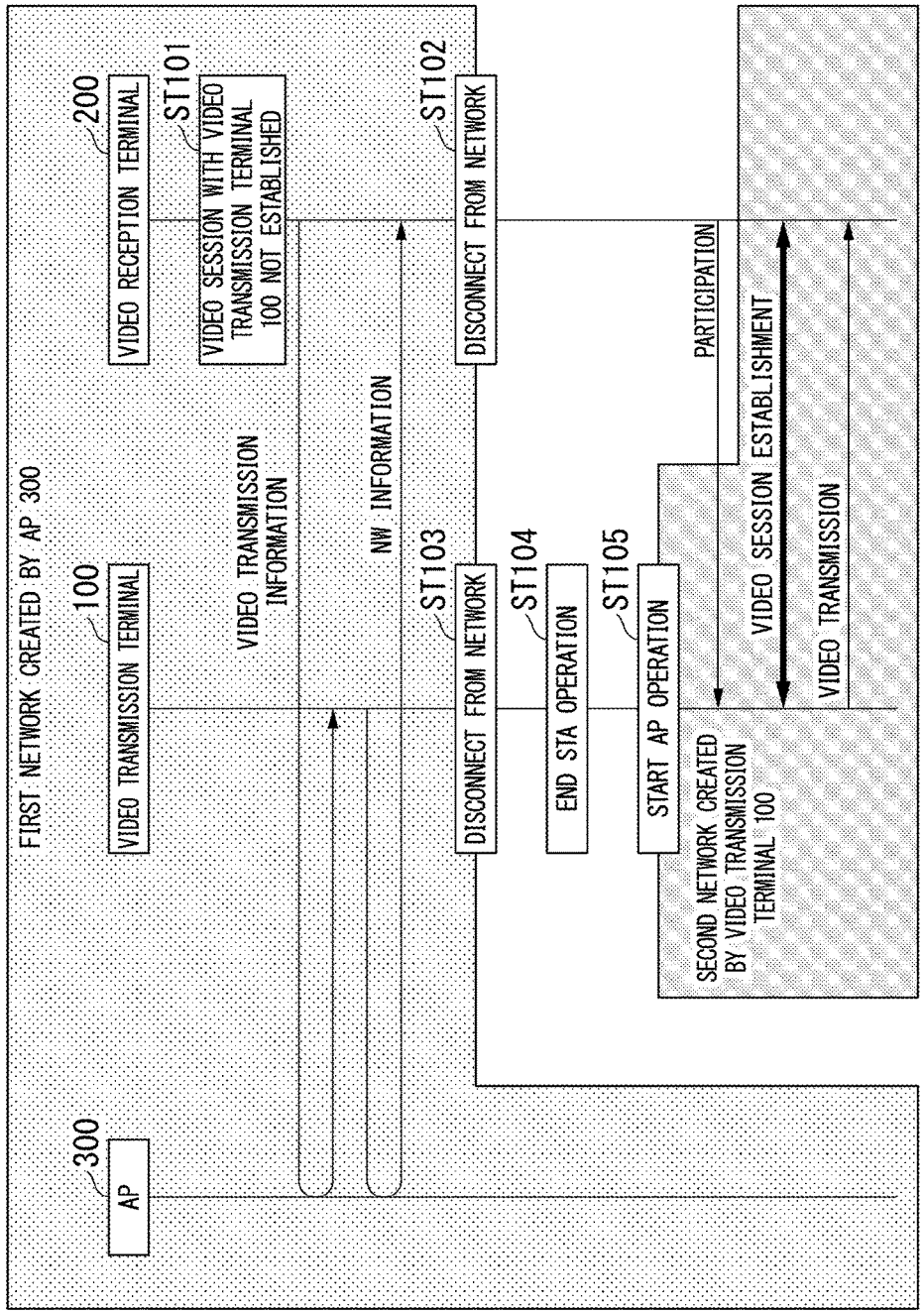
FIG. 17 is a sequence diagram showing a procedure of communication according to the fourth embodiment of the present invention.

FIG. 17 shows a procedure of communication. An operation of each terminal will be described with reference to FIG. 17. Hereinafter, differences between the operation shown in FIG. 17 and the operation shown in FIG. 6 will be described.

When the video transmission information has been received, the video transmission, terminal 100 transmits the NW information to the video reception terminal 200 in step S131. The NW information transmitted by the video transmission terminal 100 is transmitted to the video reception terminal 200 via the AP 300.

After the NW information has been transmitted, the video transmission terminal 100 is disconnected from the first network in step S103 (state ST103). When the NW information has been received (corresponding to step S231), the video reception terminal 200 is disconnected from the first network in step S205 (state ST102).

In the fourth embodiment, the video transmission terminal 100 that has received the video transmission information transmits the NW information to the video reception terminal 200. Accordingly, the video reception terminal 200 can recognize that the video transmission terminal 100 becomes the AP. Therefore, it is not necessary for the video transmission terminal 100 and the video reception terminal 200 to determine which of the video transmission terminal 100 and the video reception terminal 200 becomes the AP. Thus, it is possible to shorten the time taken to start video transmission.

In the fourth embodiment, the video reception terminal 200 can connect to the AP using NW information regarding the second network. When some STAs search for the AP, the STAs perform a search for all APs without designating a network identifier. After the AP matching the purpose of the search is found, the STA designates the network identifier of the AP and searches for the AP again. When the NW information is the network identifier, an operation of searching all APs without designating the network identifier when searching for the AP can be omitted. The video reception terminal 200 can designate the network identifier indicated by the network information and search for the AP. Therefore, it is possible to shorten the time needed to start the video transmission.

For example, when the NW information is information on a communication channel, the video reception terminal 200 does not have to perform a search for a communication channel among all communication channels when searching for the AP. The video reception terminal 200 can search for the AP using the communication channel indicated by the NW information. Therefore, it is possible to shorten the time needed to start the video transmission.

For example, when the NW information is security information, the video reception terminal 200 can connect to the video transmission terminal 100 using the security information. Generally, after exchange of various types of information is performed according to any connection setting means (for example, Wi-Fi Protected Setup (trademark)), the security information is acquired. Alternatively, the security information is input by the user. However, a process according to the connection setting means and an input by the user are not needed. The video reception terminal 200 can connect to the AP using the security information received from the video transmission terminal 100. Therefore, it is possible to shorten the time needed to start the video transmission.

(Fifth Embodiment)

In a fifth embodiment of the present invention, the video transmission terminal 100 and the video reception terminal 200 are used.

The video transmission terminal 100 is the same as the video transmission terminal 100 of the second embodiment. After the first video session control unit 103 completes all of the processes needed to establish the video session, the first control unit 104 causes the video transmission terminal 100 to be disconnected from the first network by controlling the first communication session control unit 102 in the first transmission terminal process.

In the video reception terminal 200, the following respects are different from those in the first embodiment. After the second video session control unit 203 completes all of the processes needed to establish the video session, the second control unit 204 causes the video reception terminal 200 to be disconnected from the first network by controlling the second communication session control unit 202 in the second reception terminal process. In respects other than the above, the video reception terminal 200 of the fifth embodiment is the same as the video reception terminal 200 of the first embodiment.

An operation of the video transmission terminal 100 is the same as the operation shown in FIG. 8. Therefore, description of the operation of the video transmission terminal 100 will be omitted. After the process of step S111 is performed, the process of step S103 is performed as shown in FIG. 8. That is, after all of the processes needed to establish the video session are completed, the video transmission terminal 100 is disconnected from the first network.

Figure 18:
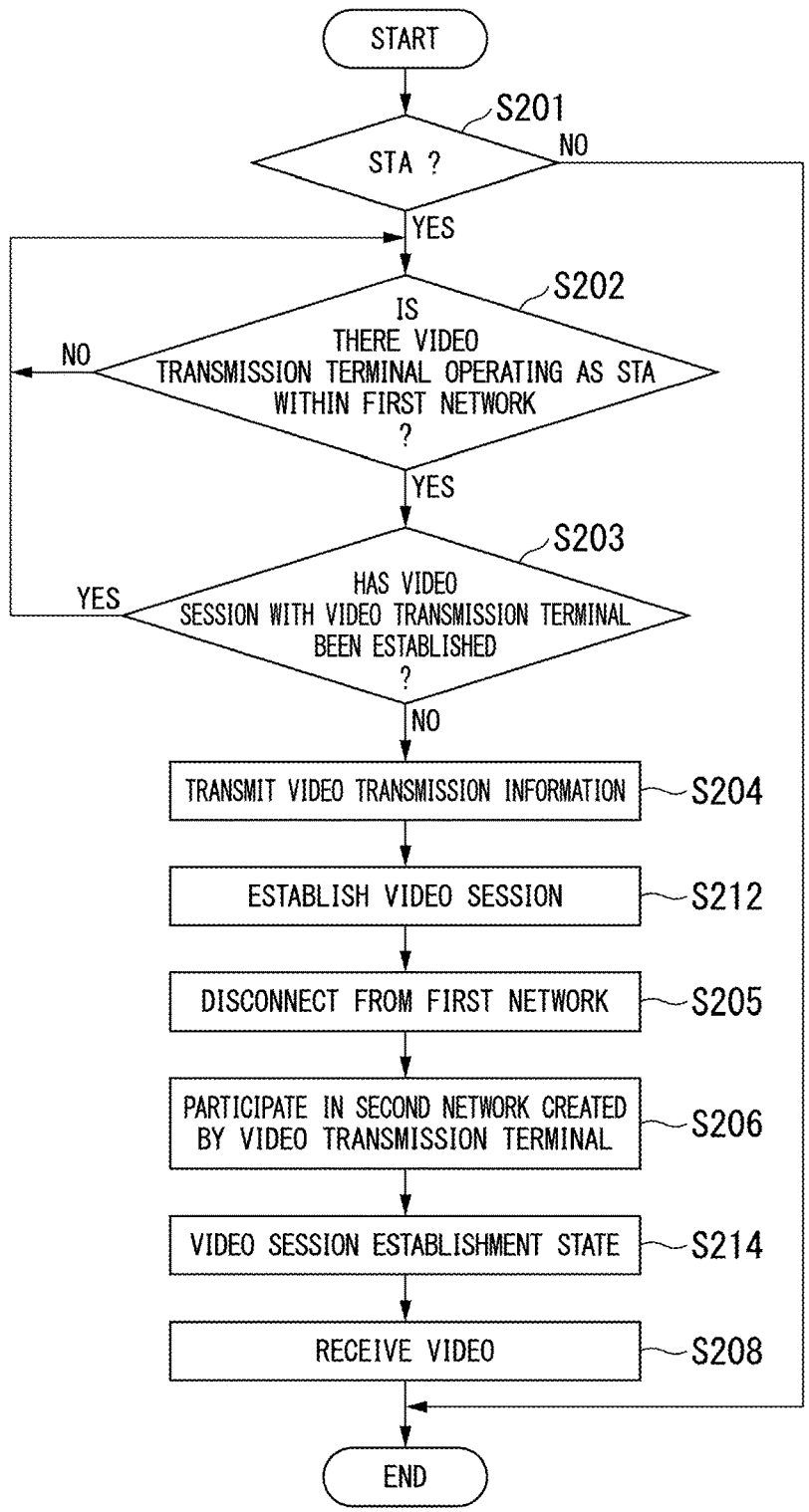
FIG. 18 is a flowchart showing a procedure of an operation of a video reception terminal of a fifth embodiment of the present invention.

FIG. 18 shows a procedure of an operation of the video reception terminal 200. An operation of the video reception terminal 200 will be described with reference to FIG. 18. Hereinafter, an operation different from the operation, shown, in FIG. 5 will be described.

After the process of step S204 is performed, the process of step S212 is performed. Step S212 is the same as step S212 in FIG. 10. In step S212, the second video session control unit 203 performs all of the processes needed to establish the video session. After the process of step S212 is performed, the process of step S205 is performed. That is, after all of the processes needed to establish the video session are completed, the video reception terminal 200 is disconnected from the first network.

After the process of step S206 is performed, the video reception terminal 200 enters a state in which the video session has been established (step S214). Step S214 is the same as step S214 of FIG. 10. After the process of step S214 is performed, the process of step S208 is performed.

Figure 19:
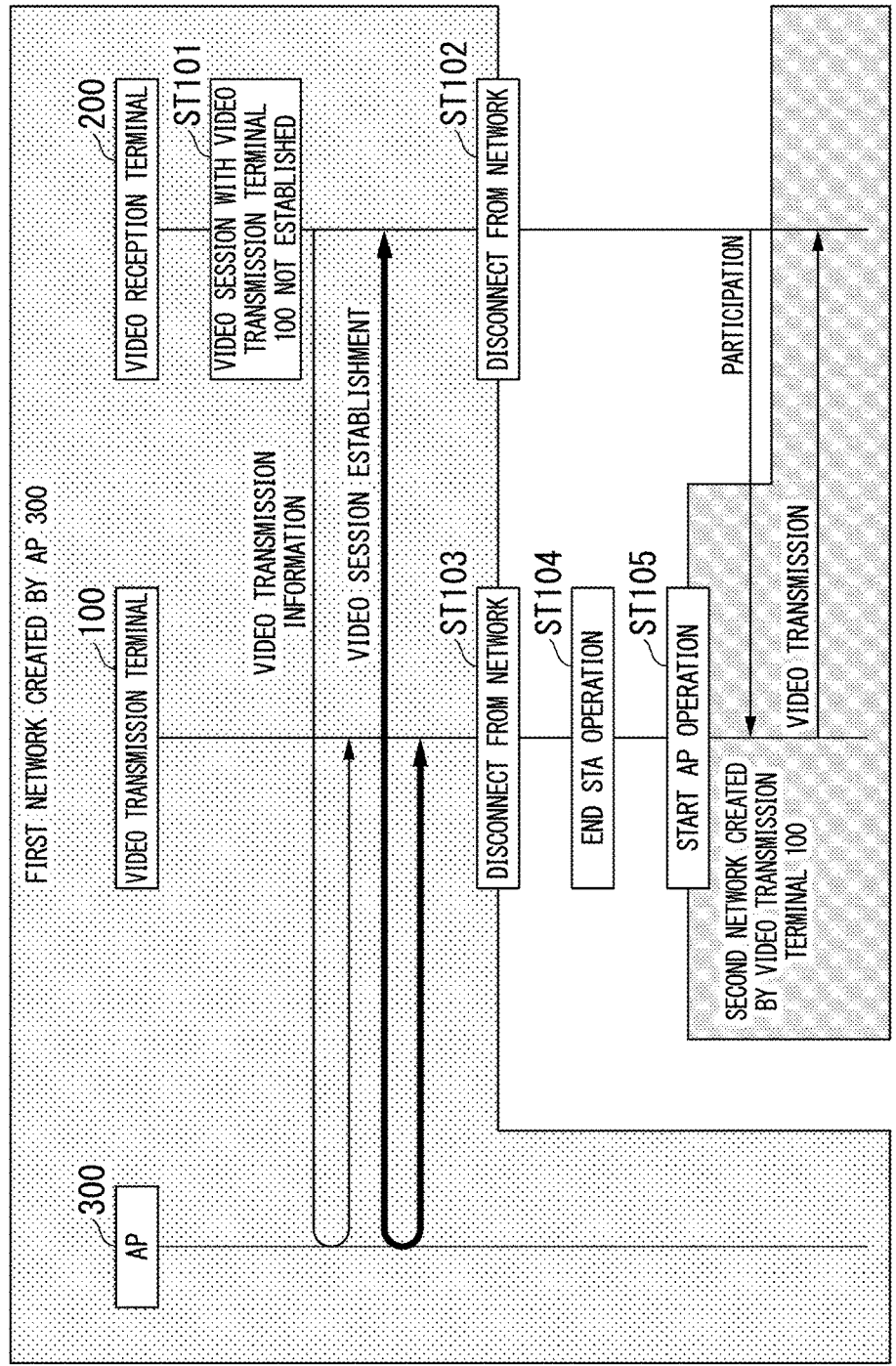
FIG. 19 is a sequence diagram showing a procedure of communication according to the fifth embodiment of the present invention.

FIG. 19 shows a procedure of communication. An operation of each terminal will be described with reference to FIG. 19. Hereinafter, differences between the operation shown in FIG. 19 and the operation shown in FIG. 6 will be described.

When the video transmission information is received (corresponding to step S102), the video transmission terminal 100 establishes the video session in step S111. After the video transmission information is transmitted, the video reception terminal 200 establishes the video session in step S212. Since the video transmission terminal 100 and the video reception terminal 200 participate in the first network, a message for establishment of the video session goes via the AP 300.

After the video session has been established, the video transmission terminal 100 is disconnected from the first network in step S303 (state ST103). After the video session has been established, the video reception terminal 200 is disconnected from the first network in step S205 (state ST102).

In respects other than the above, the operation shown in FIG. 19 is the same as the operation shown in FIG. 6.

In the fifth embodiment, establishment of the video session is completed before the video transmission terminal 100 and the video reception terminal 200 are disconnected from the first network. Therefore, it is possible to farther shorten the time needed to start video transmission from a timing at which the video transmission terminal 100 and the video reception terminal 200 have been disconnected from the first network.

(Sixth Embodiment)

Figure 20:
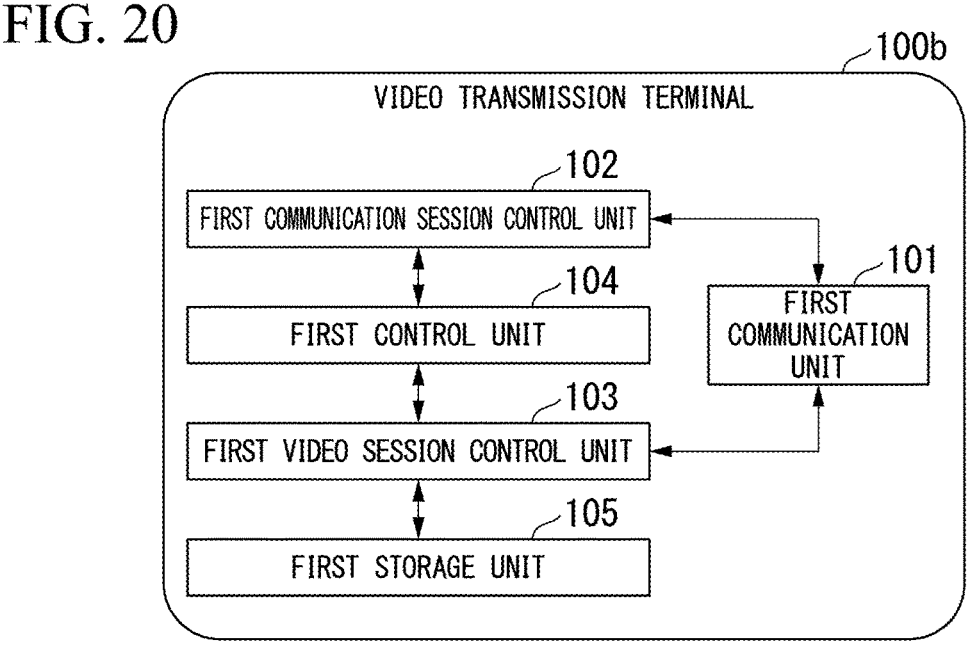
FIG. 20 is a block diagram showing a configuration of a video transmission terminal of a sixth embodiment of the present invention.

In a sixth embodiment of the present invention, the video transmission terminal 100 is changed to a video transmission terminal 100b shown in FIG. 20. Further, the video reception terminal 200 is changed to a video reception terminal 200b shown in FIG. 21.

FIG. 20 shows a configuration of the video transmission terminal 100b. As shown in FIG. 20, the video transmission terminal 100b includes a first communication unit 101, a first communication session control unit 102, a first video session control unit 103, a first control unit 104, and a first storage unit 105.

Differences between the configuration shown in FIG. 20 and the configuration shown in FIG. 2 will be described. The first, storage unit 105 stores messages that are exchanged for establishment of the video session. The first storage unit 105 may be detachable from the video transmission terminal 100b. Thus, the first storage unit 105 is not essential to the video transmission terminal 100b.

Before the video transmission terminal 100b is disconnected from the first network, the first control unit 104 causes the first video session control unit 103 to execute some (a fat process) of the processes needed to establish a video session with the video reception terminal 200b in the third transmission terminal process. After the second network is created, the first control unit 104 causes the first video session control unit 103 to execute the rest (a second process) of the processes needed to establish a video session with the video reception terminal 200b in the third transmission terminal process.

In respects other than the above, the configuration shown in FIG. 20 is the same as that shown in FIG. 2.

Figure 21:
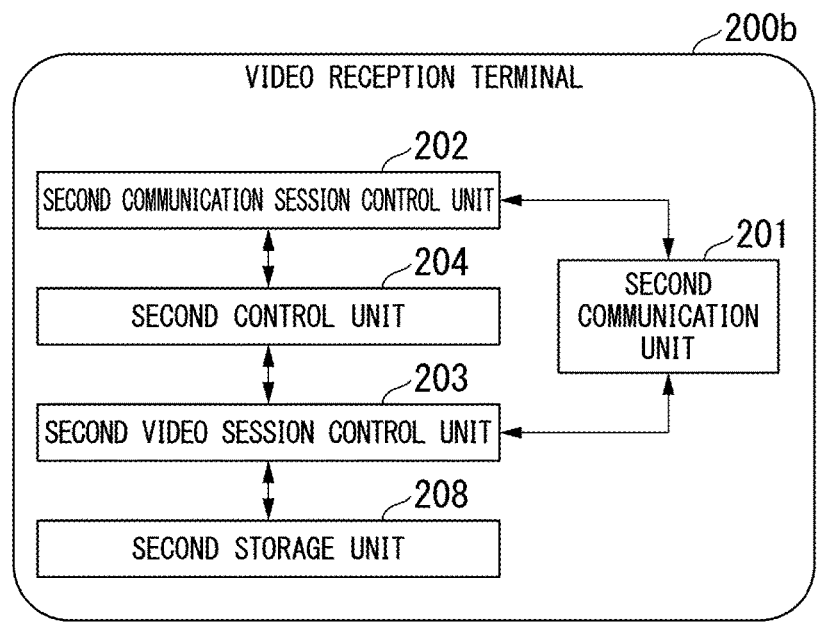
FIG. 21 is a block diagram showing a configuration of a video reception terminal of the sixth embodiment of the present invention.

FIG. 21 shows a configuration of the video reception terminal 200b. As shown in FIG. 21, the video reception terminal 200b includes a second communication unit 201, a second communication session control unit 202, a second video session control unit 203, a second control unit 204, and a second storage unit 208.

Differences between the configuration shown in FIG. 21 and the configuration shown in FIG. 3 will be described. The second storage unit 208 stores messages that are exchanged for establishment of the video session. The second storage unit 208 may be detachable from the video reception terminal 200b. Accordingly, the second storage unit 208 is not essential to the video reception terminal 200b.

Before the video reception terminal 200b is disconnected from the first network, the second control unit 204 causes the second video session control unit 203 to execute some (a third process) of processes needed to establish the video session with the video transmission terminal 100b in the fourth reception terminal process. After the video reception terminal 200b participates in the second network, the second control unit 204 causes the second video session control unit 203 to execute the rest (a fourth process) of the processes needed to establish the video session with the video transmission terminal 100b in the fourth reception terminal process.

In respects other than the above, the configuration shown in FIG. 21 is the same as that shown in FIG. 3.

Figure 22:
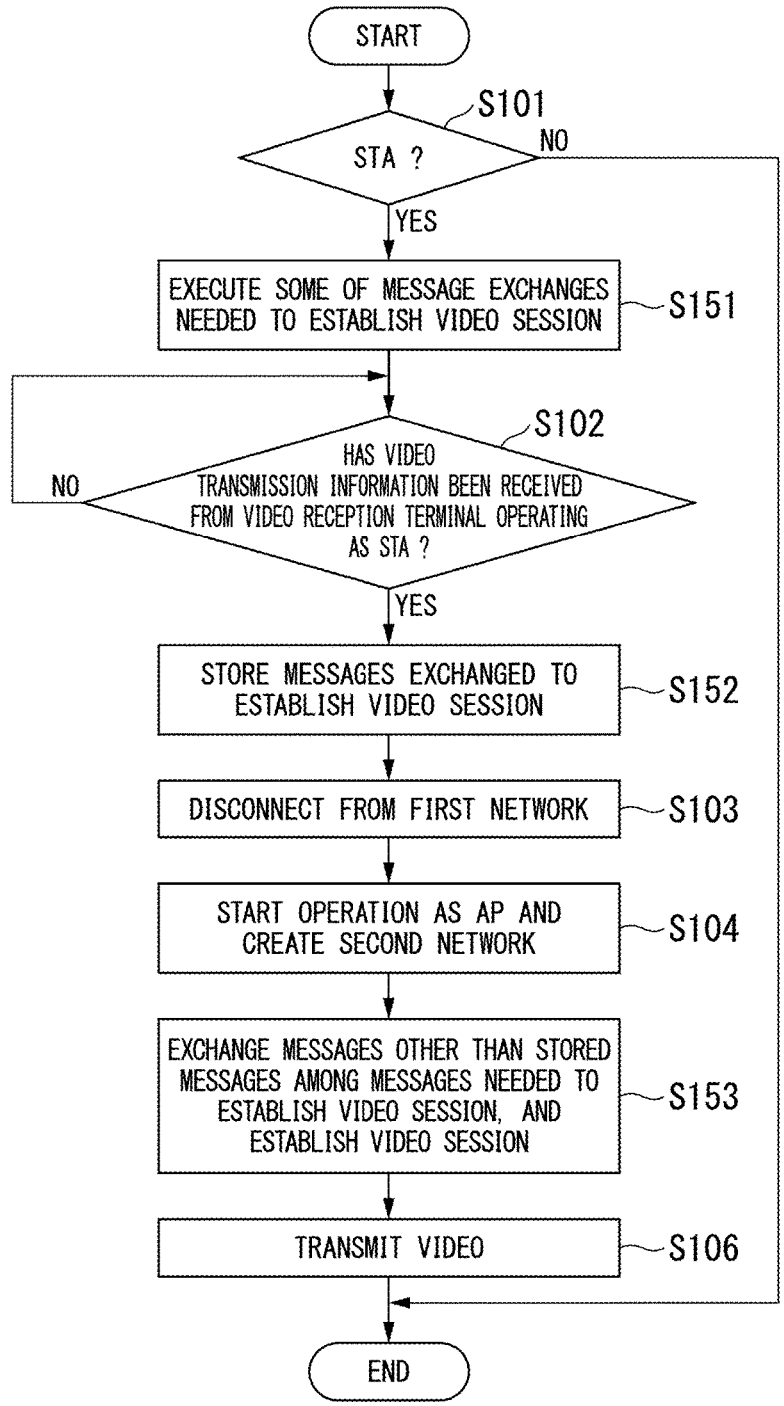
FIG. 22 is a flowchart showing a procedure of an operation of the video transmission terminal of the sixth embodiment of the present invention.

FIG. 22 shows a procedure of an operation of the video transmission terminal 100b. An operation of the video transmission terminal 100b will be described with reference to FIG. 22, Hereinafter, an operation different from the operation shown in FIG. 4 will be described.

As described in the first embodiment, the video transmission terminal 100b receives the response transmitted from the other terminal when the video transmission terminal 100b searches for the AP. Alternatively, the video transmission terminal 100b receives information transmitted from the other terminal when the other terminal searches for the AP. Alternatively, the video transmission terminal 100b receives information that the video reception terminal 200b transmits in order to search for the video transmission terminal 100b. The first control unit 104 recognizes the video reception terminal 200b on the basis of the above information.

In step S105, when the video transmission terminal 100b is operating as an STA, the first control unit 104 causes the first video session control unit 103 to execute some of the processes needed to establish the video session with the video reception terminal 200b (step S151). Accordingly, the first video session control unit 203 executes some of the processes needed to establish the video session. That, is, the first video session control unit 103 transmits some of the messages needed to establish the video session to the video reception terminal 200b using the first communication unit 101. Further, the first video session control unit 103 receives some of the messages needed to establish the video session from the video reception terminal 200b using the first communication unit 101.

After the process of step S151 is performed, the process of step S302 is performed. For example, while the process of step S151 is performed, the process of step S102 is performed at a timing at which an application for video transmission has started.

When the video transmission information is received in step S102, the first video session control unit 103 causes the message exchanged with the video reception terminal 200b in step S151 to be stored in the first storage unit 105 (step S152). Thus, the first storage unit 105 stores the message transmitted, to the video reception terminal 200b and the message received from the video reception terminal 200b.

The first storage unit 105 may store a flag indicating that each of the messages needed to establish the video session has been transmitted or received. In step S152, a value of the flag corresponding to the message exchanged with the video reception terminal 200b in step S151 may be changed to a value indicating that the message has been transmitted or received.

After the process of step S152 is performed, the process of step S103 is performed. That is, after some of the processes needed to establish the video session are performed, the video transmission terminal 100b is disconnected from the first network.

After the process of step S104 is performed, the first control unit 104 causes the first video session control unit 103 to execute the rest of the processes needed to establish the video session, with the video reception terminal 200b that has transmitted the video transmission information (step S153). Thus, the first video session control unit 103 executes the rest of the processes needed to establish the video session. That is, the first video session control unit 103 transmits the rest of the messages needed to establish the video session to the video reception terminal 200b using the first communication unit 101. Further, the first video session control unit 103 receives the rest of the messages needed to establish foe video session from the video reception terminal 200b using the first communication unit 101. In step S153, the establishment of the video session with the video reception terminal 200b is completed.

For example, transmission and reception of n messages are needed for establishment of the video session, n is an integer greater than or equal to two. In step S151, the first, control unit 104 causes the first video session control unit 103 to execute transmission and reception of one or more messages. In step S153, the first control, unit 104 causes the first video session control unit 103 to execute transmission and reception of messages other than the messages transmitted and received in step S151 among the n messages.

In step S151, the first control unit 104 may cause the first video session control unit 103 to execute transmission and reception of a predetermined number of messages. For example, in step S151, transmission and reception of k messages may be performed. k is an integer greater than or equal to one and smaller than n.

In step S151 transmission and reception of all of n messages needed to establish the video session may be performed. In this case, the process of step S153 is not performed.

After the process of step S153 is performed, the process of step S106 is performed. The video transmission information received from the video reception terminal 200b in step S102 does not include the message for establishing the video session.

In the operation shown in FIG. 22, before the video transmission information is received, the first video session control unit 103 executes some of the processes needed to establish the video session. After the video transmission information is received and before the video transmission terminal 100b is disconnected from the first network, the first video session control unit 103 may execute some of the processes needed to establish the video session. The first video session control unit 103 may execute some of the processes needed to establish the video session before the video transmission information is received and after the video transmission information is received.

In respects other than the above, the operation shown in FIG. 22 is the same as the operation shown in FIG. 4.

Figure 23:
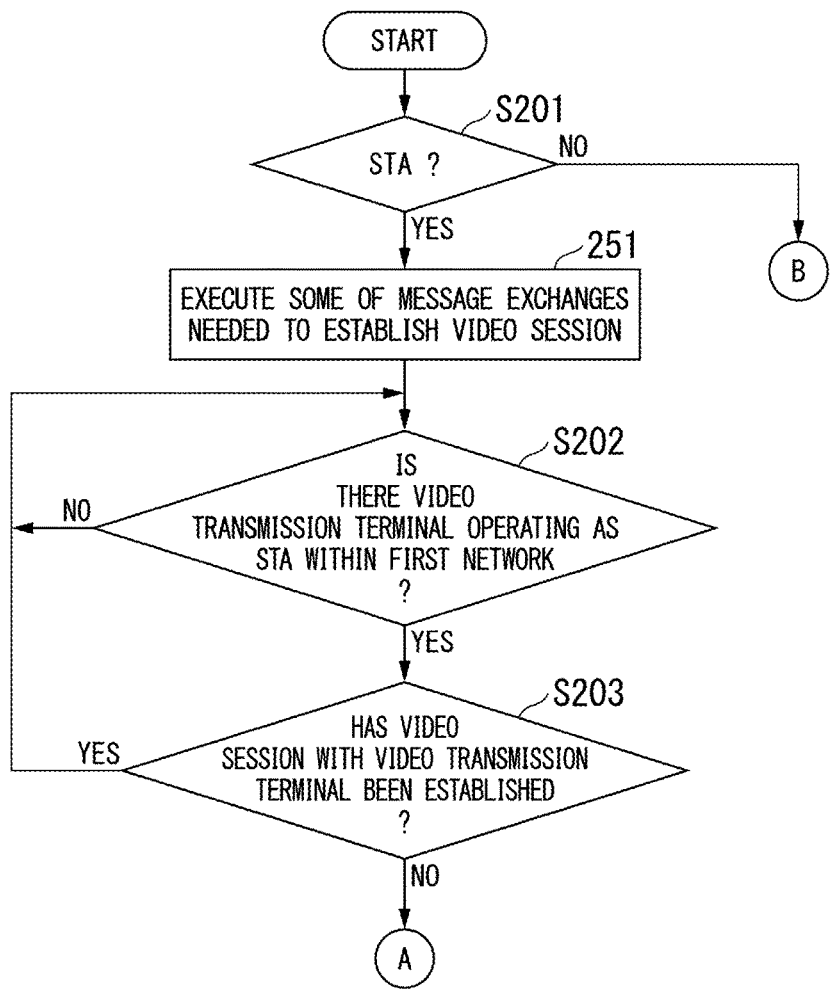
FIG. 23 is a flowchart showing a procedure of an operation of the video reception terminal of the sixth embodiment of the present invention.
Figure 24:
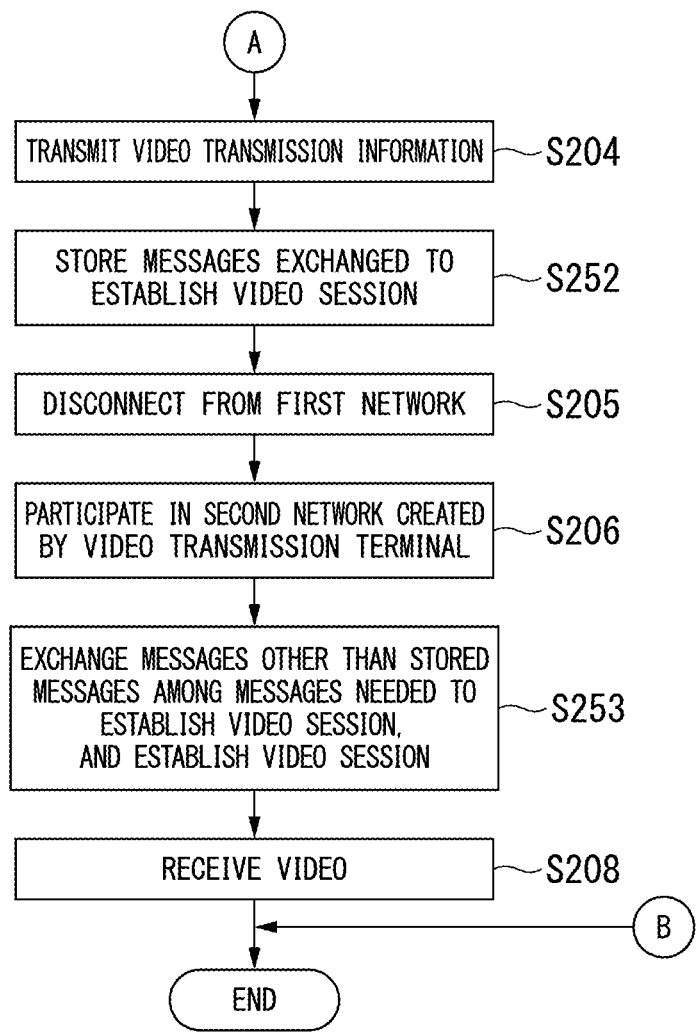
FIG. 24 is a flowchart showing a procedure of an operation of the video reception terminal of the sixth embodiment of the present invention.

FIGS. 23 and 24 show a procedure of an operation of the video reception terminal 200b. An operation of the video reception terminal 200b will be described with reference to FIGS. 23 and 24. Hereinafter, an operation different from the operation shown in FIG. 5 will be described.

As described in the first embodiment, the video reception terminal 200b receives the response transmitted from the other terminal when the video reception terminal 200b searches for the AP. Alternatively, the video reception terminal 200b receives information transmitted from the other terminal when the other terminal searches for the AP. Alternatively, the video reception terminal 200b receives information that the video transmission terminal 100b transmits in order to search for the video reception terminal 200b. The second control unit 204 recognizes the video transmission terminal 100b on the basis of the above information.

In step S201, when the video reception terminal 200b is operating as an STA, the second control unit 204 causes the second video session control unit 203 to execute some of the processes needed to establish the video session with the video transmission terminal 100b (step S251). Accordingly, the second video session control unit 203 executes some of the processes needed to establish the video session. That is, the second video session control unit 203 transmits some of the messages needed to establish the video session to the video transmission terminal 100b using the second communication unit 201. Further, the second video session control unit 203 receives some of the messages needed to establish the video session from the video transmission terminal 100b using the second communication unit 201.

After the process of step S251 is performed, the process of step S202 is performed. For example, while the process of step S251 is performed, the process of step S202 is performed at a timing at which an application for video reception has started.

After the process of step S204 is performed, the second video session control unit 203 causes the message exchanged with the video transmission terminal 100b in step S251 to be stored in the second storage unit 208 (step S252). Thus, the second storage unit 208 stores the message transmitted to the video transmission terminal 100b and the message received from the video transmission terminal 100b.

The second storage unit 208 may store a flag indicating that each of the messages needed to establish the video session has been transmitted or received. In step S252, a value of the flag corresponding to the message exchanged with the video transmission terminal 100b in step S251 may be changed to a value indicating that the message has been transmitted or received.

After the process of step S252 is performed, the process of step S205 is performed. That is, after some of the processes needed to establish the video session are performed, the video reception terminal 200b is disconnected from the first network.

After the process of step S206 is performed, the second control unit 204 causes the second video session control unit 203 to execute the rest of the processes needed to establish the video session with the video transmission terminal 100b that has received the video transmission information (step S253). Thus, the second video session control unit 203 executes the rest of the processes needed to establish the video session. That is, the second video session control unit 203 transmits the rest of the messages needed to establish the video session to the video transmission terminal 100b using the second communication unit 201. Further, the second video session control unit 203 receives the rest of the messages needed to establish the video session from the video transmission terminal 100b using the second communication unit 201. In step S253, the establishment of the video session with the video transmission terminal 100b is completed.

For example, transmission and reception of n messages are needed for establishment of the video session. n is an integer greater than or equal to two. In step S251, the second control unit 204 causes the second video session control unit 203 to execute transmission and reception of one or more messages. In step S253, the second control unit 204 causes the second video session, control unit 203 to execute transmission and reception of messages other than the messages transmitted and received in step S251 among the n messages.

In step S251, the second control unit 204 may cause the second video session control unit 203 to execute transmission and reception of a predetermined number of messages. For example, in step S251, transmission and reception of k messages may be performed. k is an integer greater than or equal to one and smaller than n.

In step S251, transmission and reception of all of n messages needed to establish the video session may be performed. In this case, the process of step S253 is not performed.

After the process of step S253 is performed, the process of step S208 is performed. The video transmission information transmitted to the video transmission terminal 100*b* in step S204 does not include the message for establishing the video session.

In the operation shown in FIGS. 23 and 24, before the video transmission information is transmitted, the second video session control unit 203 executes some of the processes needed to establish the video session. After the video transmission information is transmitted and before the video reception terminal 200*b* is disconnected from the first network, the second video session control unit 203 may execute some of the processes needed to establish the video session. The second video session control unit 203 may execute some of the processes needed to establish the video session before the video transmission information is transmitted and after the video transmission information is transmitted.

In respects other than the above, the operation shown in FIGS. 23 and 24 is the same as the operation shown in FIG. 5.

Figure 25:
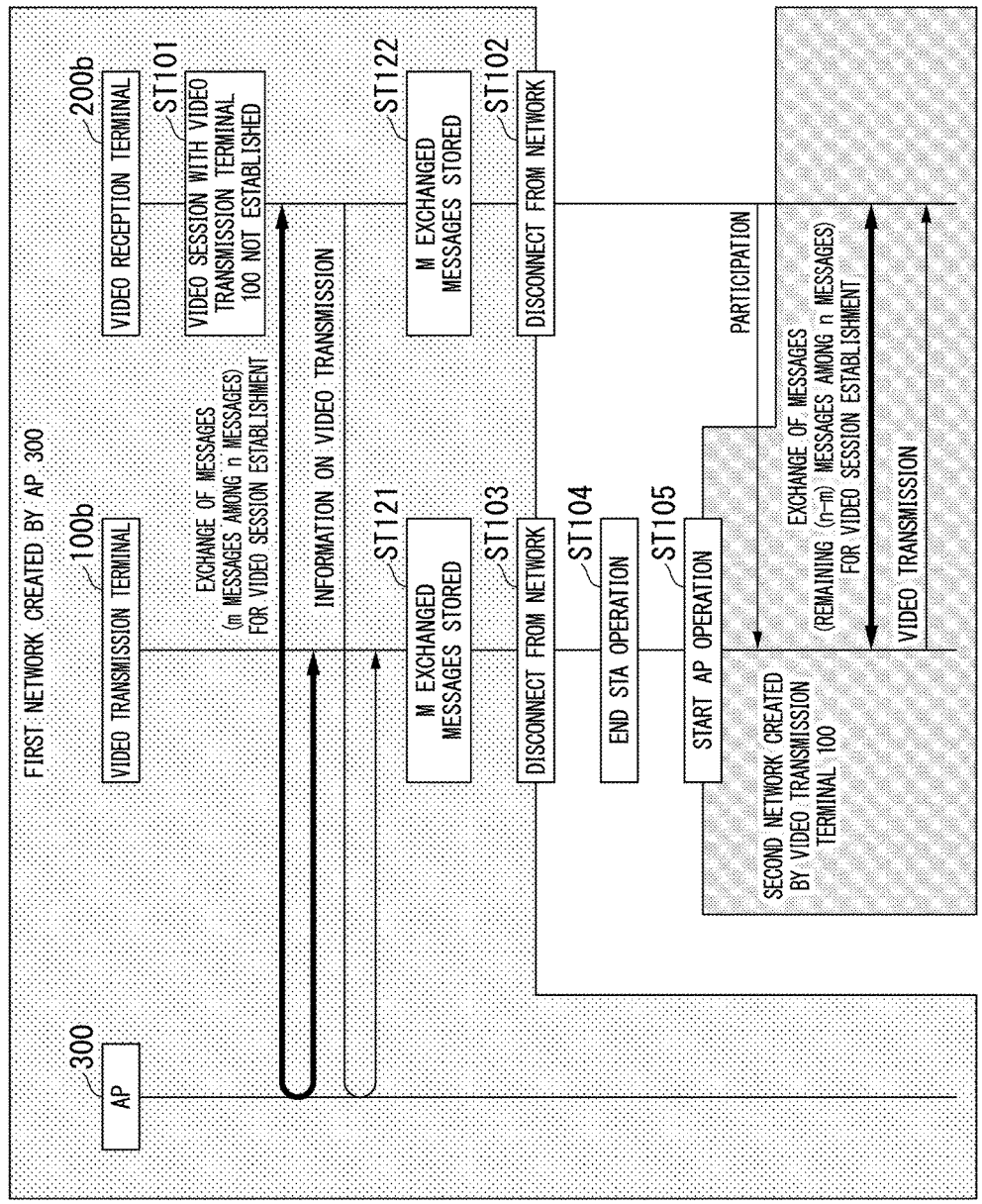
FIG. 25 is a sequence diagram showing a procedure of communication in the sixth embodiment of the present invention.

FIG. 25 shows a procedure of communication. An operation of each terminal will be described with reference to FIG. 25. Hereinafter, differences between the operation shown in FIG. 25 and the operation shown in FIG. 6 will be described.

The video transmission terminal 100*b* and the video reception terminal 200*b* exchange m messages among the n message needed to establish the video session in steps S151 and S251. n is an integer greater than or equal to two. m is an integer greater than or equal to one and smaller than n.

After the m messages are exchanged, the video reception terminal 200*b* transmits the video transmission information in step S204. When the video transmission information is received (corresponding to step S102), the video transmission terminal 100*b* in step S152 stores the m messages exchanged in step S151 (state ST121). After video transmission information is transmitted, the video reception terminal 200*b* in step S252 stores the m messages exchanged in step S251 (state ST122).

After the messages are stored, the video transmission terminal 100*b* is disconnected from the first network in step S103 (state ST103). After the messages are stored, the video reception terminal 200*b* is disconnected from the first network in step S205 (state ST102).

The video reception terminal 200*b* participates in the second network in step S206. The video transmission terminal 100*b* and the video reception terminal 200*b* exchange (n-m) messages among the n messages needed to establish the video session in steps S153 and S253. Thus, establishment of the video session is completed. After the second network is generated and the video session is established, the video transmission terminal 100*b* transmits the video to the video reception terminal 200*b* in step S106. After the video reception terminal 200*b* participates in the second network and the video session is established, the video reception terminal 200*b* receives the video from the video transmission terminal 100*b* in step S208.

In respects other than the above, the operation shown in FIG. 25 is the same as the operation shown in FIG. 6.

In the fifth embodiment, before the video transmission terminal 100*b* and the video reception terminal 200*b* are disconnected from the first network, the video transmission terminal 100*b* and the video reception terminal 200*b* exchange some of messages for establishment of the video session. After the video transmission terminal 100*b* and the video reception terminal 200*b* participate in the second network, the video transmission terminal 100*b* and the video reception terminal 200*b* exchange the rest of the messages for establishment of the video session. Therefore, after the video transmission terminal 100*b* and the video reception terminal 200*b* participate in the second network, the number of messages exchanged between the video transmission terminal 100*b* and the video reception terminal 200*b* decreases. Therefore, it is possible to further shorten she time needed to start video transmission from a timing at which the video transmission terminal 100*b* and the video reception terminal 200*b* have been disconnected from the first network.

While preferred embodiments of the invention, have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A video communication system, comprising a video transmission terminal and a video reception terminal;
   wherein the video transmission terminal includes
      a first communication unit,
      a first communication session processor circuit configured to create a network when the video transmission terminal operates as an access point, and participates in a network created by the access point when the video transmission terminal operates as a station,
      a first video session processor circuit configured to establish a video session with the video reception terminal, and transmits a video to the video reception terminal with which the video session is established using the first communication unit after the video session is established, and
      a first processor circuit configured to execute a first transmission terminal process, a second transmission terminal process, and a third transmission terminal process,
   in a case in which video transmission information regarding video transmission is received from the video reception terminal while the video transmission terminal operates as the station and the video transmission terminal participates in a first network, the first processor circuit causes the video transmission terminal to be disconnected from the first network by controlling the first communication session processor circuit in the first transmission terminal process,
   after the video transmission terminal is disconnected from the first network, the first processor circuit causes the video transmission terminal to start an operation as the access point by controlling the first communication session processor circuit and causes the first communication session processor circuit to create a second network in the second transmission terminal process,
   in the third transmission terminal process, the first processor circuit causes the first video session processor circuit to establish the video session with the video reception terminal, and
   the first network is a network created by a terminal different from the video transmission terminal and the video reception terminal, and the video reception terminal that transmits the video transmission information is a terminal that has participated in the first network and of which the video session has not been established with the video transmission terminal, and wherein the video reception terminal includes
  a second communication unit,
  a second communication session processor circuit configured to create a network when the video reception terminal operates as the access point, and participates in a network created by the access point when the video reception terminal operates as the station,
  a second video session processor circuit configured to establish the video session with the video transmission terminal, and receives the video from the video transmission terminal with which the video session is established using the second communication unit after the video session is established, and
  a second processor circuit configured to execute a first reception terminal process, a second reception terminal process, a third reception terminal process, and a fourth reception terminal process,
while the video reception terminal operates as the station and the video reception terminal participates in the first network, the second processor circuit transmits the video transmission information to the video transmission terminal using the second communication unit in the first reception terminal process,
after the video transmission information is transmitted, the second processor circuit causes the video reception terminal to be disconnected from the first network by controlling the second communication session processor circuit in the second reception terminal process,
after the video reception terminal is disconnected from the first network, the second processor circuit causes the video reception terminal to participate in the second network by controlling the second communication session processor circuit in the third reception terminal process,
in the fourth reception terminal process, the second processor circuit causes the second video session processor circuit to establish the video session with the video transmission terminal, and
the video transmission terminal that receives the video transmission information is a terminal that has participated in the first network and of which the video session has not been established with the video reception terminal.

2. The video communication system according to claim 1, wherein in the third transmission terminal process, the first processor circuit causes the first video session processor circuit to execute at least some of the processes needed to establish the video session with the video reception terminal before the video transmission terminal is disconnected from the first network, and
after the first processor circuit causes the first video session processor circuit to execute at least some of the processes needed to establish the video session, the first processor circuit executes the first transmission terminal process.

3. The video communication system according to claim 2, wherein the processes needed to establish the video session include at least, exchange of messages regarding a determination of a video format, exchange of messages regarding a determination of an audio format, and exchange of messages regarding a confirmation as to whether or not preparation for video transmission has been completed in the video transmission terminal and the video reception terminal.

4. The video communication system according to claim 2, wherein in the first transmission terminal process, the first processor circuit causes the video transmission terminal to be disconnected from the first network after the first video session processor circuit completes all of the processes needed to establish the video session by controlling the first communication session processor circuit, and
in the second reception terminal process, the second processor circuit causes the video reception terminal to be disconnected from the first network after the second video session processor circuit completes all of the processes needed to establish the video session by controlling the second communication session processor circuit.

5. The video communication system according to claim 4, wherein the video reception terminal further comprises an application configured to display the video received from the video transmission terminal by controlling a display unit,
when the application starts, the second processor circuit executes the first reception terminal process,
the second processor circuit causes the second video session processor circuit to perform all of the processes needed to establish the video session in the fourth reception terminal process between a point in time at which the application starts and a point in time at which the video transmission terminal that transmits the video that is displayed by the application is specified, and
after the video transmission terminal is specified, the second processor circuit executes the second reception terminal process.

6. The video communication system according to claim 2, wherein in the third transmission terminal process, the first processor circuit causes the first video session processor circuit to execute some of the processes needed to establish the video session with the video reception terminal before the video transmission terminal is disconnected from the first network, and in the third transmission terminal process, the first processor circuit causes the first video session processor circuit to execute the rest of the processes needed to establish the video session with the video reception terminal after the second network is created, and
in the fourth reception terminal process, the second processor circuit causes the second video session processor circuit to execute some of the processes needed to establish the video session with the video transmission terminal before the video reception terminal is disconnected from the first network, and in the fourth reception terminal process, the second processor circuit causes the second video session processor circuit to execute the rest of the processes needed to establish the video session with the video transmission terminal after the video reception terminal participates in the second network.

7. The video communication system according to claim 1, wherein in the first transmission terminal process, the first processor circuit transmits network information to the video reception terminal that has transmitted the video transmission information by controlling the first communication unit,
the network information includes at least one of identification information, channel information, and security information,
the identification information is for identifying the second network,
the channel information is related to a communication channel that is used in the second network, the security information is related to authentication needed to participate in the second network, and after the network information is transmitted, the first processor circuit causes the video transmission terminal to be disconnected from the first network by controlling the first communication session processor circuit in the first transmission terminal process.

8. The video communication system according to claim 1, wherein in the first transmission terminal process, the first processor circuit transmits access point information to the video reception terminal that has transmitted the video transmission information by controlling the first communication unit, the access point information indicates that the video transmission terminal becomes the access point, and after the access point information is transmitted, the first processor circuit causes the video transmission terminal to be disconnected from the first network by controlling the first communication session processor circuit in the first transmission terminal process.

9. A video transmission terminal, comprising:

a first communication unit;

a first communication session processor circuit configured to create a network when the video transmission terminal operates as an access point, and participates in a network created by the access point when the video transmission terminal operates as a station;

a first video session processor circuit configured to establish a video session with the video reception terminal, and transmits a video to the video reception terminal with which the video session is established using the first communication unit after the video session is established; and a first processor circuit configured to execute a first transmission terminal process, a second transmission terminal process, and a third transmission terminal process, wherein in a case in which video transmission information regarding video transmission is received from the video reception terminal while the video transmission terminal operates as the station and the video transmission terminal participates in a first network, the first processor circuit causes the video transmission terminal to be disconnected from the first network by controlling the first communication session processor circuit in the first transmission terminal process, after the video transmission terminal is disconnected from the first network, the first processor circuit causes the video transmission terminal to start an operation as the access point by controlling the first communication session processor circuit and causes the first communication session processor circuit to create a second network in the second transmission terminal process, in the third transmission terminal process, the first processor circuit causes the first video session processor circuit to establish the video session with the video reception terminal, and the first network is a network created by a terminal different from the video transmission terminal and the video reception terminal, and the video reception terminal that transmits the video transmission information is a terminal that has participated in the first network and of which the video session has not been established with the video transmission terminal.

10. A video reception terminal, comprising:

a second communication unit;

a second communication session processor circuit configured to create a network when the video reception terminal operates as an access point, and participates in a network created by the access point when the video reception terminal operates as a station;

a second video session processor circuit configured to establish a video session with the video transmission terminal, and receives a video from the video transmission terminal with which the video session is established using the second communication unit after the video session is established; and a second processor circuit configured to execute a first reception terminal process, a second reception terminal process, a third reception terminal process, and a fourth reception terminal process, wherein while the video reception terminal operates as the station and the video reception terminal participates in the first network, the second processor circuit transmits video transmission information regarding video transmission to the video transmission terminal using the second communication unit in the first reception terminal process, after the video transmission information is transmitted, the second processor circuit causes the video reception terminal to be disconnected from the first network by controlling the second communication session processor circuit in the second reception terminal process, after the video reception terminal is disconnected from the first network, the second processor circuit causes the video reception terminal to participate in the second network by controlling the second communication session processor circuit in the third reception terminal process, in the fourth reception terminal process, the second processor circuit causes the second video session processor circuit to establish the video session with the video transmission terminal, the first network is a network created by a terminal different from the video transmission terminal and the video reception terminal, and the second network is a network created by the video transmission terminal that receives the video transmission information, and the video transmission terminal that receives the video transmission information is a terminal that has participated in the first network and of which the video session has not been established with the video reception terminal.

11. A communication method, comprising a first step, a second step, a third step, and a fourth step, wherein a video transmission terminal creates a network when the video transmission terminal operates as an access point, and participates in a network created by the access point when the video transmission terminal operates as a station, in a case in which video transmission information regarding video transmission is received from a video reception terminal while the video transmission terminal operates as the station and the video transmission terminal participates in a first network, the video transmission terminal is disconnected from the first network in the first step, after the video transmission terminal is disconnected from the first network, the video transmission terminal starts an operation as the access point and creates a second network in the second step, in the third step, the video transmission terminal establishes a video session with the video reception terminal, in the fourth step, the video transmission terminal transmits a video to the video reception terminal with which the video session is established after the video session is established, and the first network is a network created by a terminal different from the video transmission terminal and the video reception terminal, and the video reception terminal that transmits the video transmission information is a terminal that has participated in the first network and of which the video session has not been established with the video transmission terminal.

12. A communication method, comprising a first step, a second step, a third step, a fourth step, and a fifth step, wherein a video reception terminal creates a network when the video reception terminal operates as an access point, and participates in a network created by the access point when the video reception terminal operates as a station, while the video reception terminal operates as the station and the video reception terminal participates in a first network, the video reception terminal transmits video transmission information regarding video transmission to a video transmission terminal in the first step, after the video transmission information is transmitted, the video reception terminal is disconnected from the first network in the second step, after the video reception terminal is disconnected from the first network, the video reception terminal participates in a second network in the third step, in the fourth step, the video reception terminal establishes a video session with the video transmission terminal, in the fifth step, the video reception terminal receives a video from the video transmission terminal with which the video session is established after the video session is established, the first network is a network created by a terminal different from the video transmission terminal and the video reception terminal, and the second network is a network created by the video transmission terminal that receives the video transmission information, and the video transmission terminal that receives the video transmission information is a terminal that has participated in the first network and of which the video session has not been established with the video reception terminal.

13. A non-transitory computer readable recording medium saving a program to cause a computer of a video transmission terminal to execute a first step, a second step, a third step, and a fourth step, wherein a video transmission terminal creates a network when the video transmission terminal operates as an access point, and participates in a network created by the access point when the video transmission terminal operates as a station, in a case in which video transmission information regarding video transmission is received from a video reception terminal while the video transmission terminal operates as the station and the video transmission terminal participates in a first network, the video transmission terminal is disconnected from the first network in the first step, after the video transmission terminal is disconnected from the first network, the video transmission terminal starts an operation as the access point and creates a second network in the second step, in the third step, the video transmission terminal establishes a video session with the video reception terminal, in the fourth step, the video transmission terminal transmits a video to the video reception terminal with which the video session is established after the video session is established, and the first network is a network created by a terminal different from the video transmission terminal and the video reception terminal, and the video reception terminal that transmits the video transmission information is a terminal that has participated in the first network and of which the video session has not been established with the video transmission terminal.

14. A non-transitory computer readable recording medium saving a program to cause a computer of a video reception terminal to execute a first step, a second step, a third step, a fourth step, and a fifth step, wherein the video reception terminal creates a network when the video reception terminal operates as an access point, and participates in a network created by the access point when the video reception terminal operates as a station, while the video reception terminal operates as the station and the video reception terminal participates in a first network, the video reception terminal transmits video transmission information regarding video transmission to a video transmission terminal in the first step, after the video transmission information is transmitted, the video reception terminal is disconnected from the first network in the second step, after the video reception terminal is disconnected from the first network, the video reception terminal participates in a second network in the third step, in the fourth step, the video reception terminal establishes a video session with the video transmission terminal, in the fifth step, the video reception terminal receives a video from the video transmission terminal with which the video session is established after the video session is established, the first network is a network created by a terminal different from the video transmission terminal and the video reception terminal, and the second network is a network created by the video transmission terminal that receives the video transmission information, and the video transmission terminal that receives the video transmission information is a terminal that has participated in the first network and of which the video session has not been established with the video reception terminal.

* * * * *